United States Patent
Park et al.

(10) Patent No.: US 11,855,731 B1
(45) Date of Patent: Dec. 26, 2023

(54) PARALLEL SHIFT ESTIMATION

(71) Applicant: QUALCOMM Incorporated, San Diego, CA (US)

(72) Inventors: Seyong Park, San Diego, CA (US);
Pinar Sen, San Diego, CA (US);
Renqiu Wang, San Diego, CA (US);
Peter Gaal, San Diego, CA (US); Naga Bhushan, San Diego, CA (US);
Krishna Kiran Mukkavilli, San Diego, CA (US); Muhammad Sayed Khairy Abdelghaffar, San Jose, CA (US);
Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/944,080

(22) Filed: Sep. 13, 2022

(51) Int. Cl.
*H04B 7/06* (2006.01)
*H04B 7/0413* (2017.01)

(52) U.S. Cl.
CPC ......... *H04B 7/0634* (2013.01); *H04B 7/0413* (2013.01)

(58) Field of Classification Search
CPC ........................... H04B 7/0634; H04B 7/0413
See application file for complete search history.

(56) References Cited

U.S. PATENT DOCUMENTS

| 11,342,973 B1* | 5/2022 | Aldalbahi | H04B 7/0473 |
| 2012/0187767 A1* | 7/2012 | Kanno | H02J 50/20 |
| | | | 29/601 |

* cited by examiner

*Primary Examiner* — Sung S Ahn
(74) *Attorney, Agent, or Firm* — SUNSTEIN LLP/Qualcomm Incorporated

(57) ABSTRACT

An antenna offset compensation determination method includes: transmitting, from a first apparatus to a second apparatus, one or more first signals from a first plurality of antenna elements, of a first antenna of the first apparatus, and one or more second signals from a second plurality of antenna elements, of the first antenna; receiving, at the first apparatus from the second apparatus, one or more first indications of a first linear offset of a first signal distinction line relative to a second antenna of the second apparatus, the first signal distinction line corresponding to a first transition between the one or more first signals and the one or more second signals as received by the second antenna; and determining, based on the first linear offset, one or more compensation parameters for compensating for the first linear offset.

30 Claims, 12 Drawing Sheets

PARALLEL SHIFT ESTIMATION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

The various access technologies have been adopted in various telecommunication standards to provide a common protocol that enables different wireless devices to communicate on a municipal, national, regional, and even global level. An example telecommunication standard is new radio (NR), for example, 5G radio access. NR is a set of enhancements to the LTE mobile standard promulgated by Third Generation Partnership Project (3GPP). NR may better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. Performance of MIMO technology may be affected by misalignment of transmitting and receiving antennas.

SUMMARY

An example first apparatus includes: a transceiver including a first antenna; a memory; and a processor, communicatively coupled to the memory and the transceiver, configured to: transmit, via the transceiver to a second apparatus, one or more first signals from a first plurality of antenna elements, of the first antenna, and one or more second signals from a second plurality of antenna elements, of the first antenna; receive, via the transceiver, one or more first indications of a first linear offset of a first signal distinction line relative to a second antenna of the second apparatus, the first signal distinction line corresponding to a first transition between the one or more first signals and the one or more second signals as received by the second antenna; and determine, based on the first linear offset, one or more compensation parameters for compensating for the first linear offset.

An example antenna offset compensation determination method includes: transmitting, from a first apparatus to a second apparatus, one or more first signals from a first plurality of antenna elements, of a first antenna of the first apparatus, and one or more second signals from a second plurality of antenna elements, of the first antenna; receiving, at the first apparatus from the second apparatus, one or more first indications of a first linear offset of a first signal distinction line relative to a second antenna of the second apparatus, the first signal distinction line corresponding to a first transition between the one or more first signals and the one or more second signals as received by the second antenna; and determining, based on the first linear offset, one or more compensation parameters for compensating for the first linear offset.

Another example first apparatus includes: means for transmitting, to a second apparatus, one or more first signals from a first plurality of antenna elements, of a first antenna of the first apparatus, and one or more second signals from a second plurality of antenna elements, of the first antenna; means for receiving, from the second apparatus, one or more first indications of a first linear offset of a first signal distinction line relative to a second antenna of the second apparatus, the first signal distinction line corresponding to a first transition between the one or more first signals and the one or more second signals as received by the second antenna; and means for determining, based on the first linear offset, one or more compensation parameters for compensating for the first linear offset.

An example non-transitory, processor-readable storage medium includes processor-readable instructions to cause a processor of a first apparatus to: transmit, to a second apparatus, one or more first signals from a first plurality of antenna elements, of a first antenna of the first apparatus, and one or more second signals from a second plurality of antenna elements, of the first antenna; receive, from the second apparatus, one or more first indications of a first linear offset of a first signal distinction line relative to a second antenna of the second apparatus, the first signal distinction line corresponding to a first transition between the one or more first signals and the one or more second signals as received by the second antenna; and determine, based on the first linear offset, one or more compensation parameters for compensating for the first linear offset.

An example second apparatus includes: a transceiver including a second antenna; a memory; and a processor, communicatively coupled to the memory and the transceiver, configured to: receive, via the transceiver from a first apparatus, a first combined signal comprising a combination of one or more first signals from a first plurality of antenna elements, of a first antenna of the first apparatus, and one or more second signals from a second plurality of antenna elements, of the first antenna; determine one or more first indications of a first linear offset of a first signal distinction line relative to the second antenna, the first signal distinction line corresponding to a first differential between a first value of a first signal characteristic of the first combined signal received by a first portion of the second antenna and a second value of the first signal characteristic of the first combined signal received by a second portion of the second antenna; and determine, based on the first linear offset, one or more compensation parameters for compensating for the first linear offset.

An example antenna offset compensation determination method includes: receiving, at a second apparatus from a first apparatus, a first combined signal comprising a combination of one or more first signals from a first plurality of antenna elements, of a first antenna of the first apparatus, and one or more second signals from a second plurality of antenna elements, of the first antenna; determining, at the second apparatus, one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and determining, at the second apparatus based on the first linear offset, one or more compensation parameters for compensating for the first linear offset.

Another example second apparatus includes: means for receiving, from a first apparatus, a first combined signal comprising a combination of one or more first signals from a first plurality of antenna elements, of a first antenna of the first apparatus, and one or more second signals from a second plurality of antenna elements, of the first antenna; means for determining one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and means for determining, based on the first linear offset, one or more compensation parameters for compensating for the first linear offset.

Another example non-transitory, processor-readable storage medium includes processor-readable instructions to cause a processor of a second apparatus to: receive, from a first apparatus, a first combined signal comprising a combination of one or more first signals from a first plurality of antenna elements, of a first antenna of the first apparatus, and one or more second signals from a second plurality of antenna elements, of the first antenna; determine one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and determine, based on the first linear offset, one or more compensation parameters for compensating for the first linear offset.

DETAILED DESCRIPTION

Figure 1A:
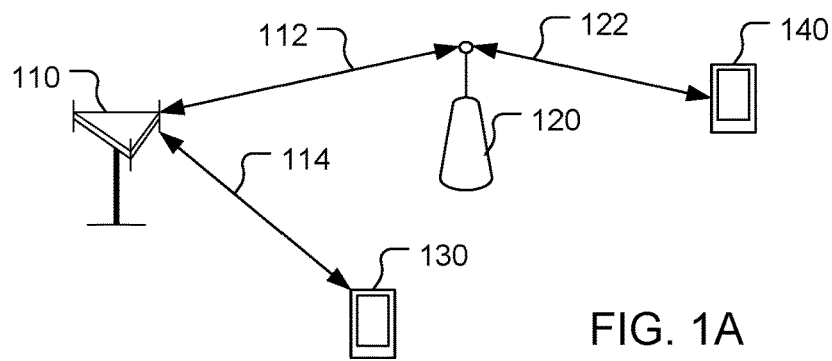
FIG. 1A is a simplified diagram of an example wireless communication network.

Parallel shift between a transmitting antenna and a receiving antenna is an offset of the antennas in a plane orthogonal to a boresight direction of the transmitting antenna. For example, assuming an x-y-z coordinate system, if the transmitting antenna lies in an x-y plane, a center of the transmitting antenna is disposed on the z-axis, boresight of the transmitting antenna is along the z-axis, and the receiving antenna lies in a plane parallel to the x-y plane, then the parallel shift is a magnitude and direction of offset of a center of the receiving antenna from the z-axis. Techniques are discussed herein for estimating parallel shift between transmitting and receiving antennas, and compensating for (e.g., adjusting to or counteracting (e.g., correcting or reducing)) the parallel shift, e.g., to improve signal transmission between the antennas. The parallel shift(s) may be compensated, for example, by determining and applying signal-processing matrixes. For example, one or more pilot signals for determining the parallel shift may comprise different signals transmitted by different portions of an antenna of a transmitting apparatus. Characteristics of the pilot signal(s) (e.g., type of disparity(ies) of signals of the pilot signal, one or more indications of portions of a transmitting antenna transmitting the different signals, etc.) may be provided to a receiving apparatus. The receiving apparatus receives the pilot signal(s) and determines a parallel shift of an antenna of the receiving apparatus relative to an antenna of the transmitting apparatus based on transmitted and received signal characteristics, e.g., transmitted signal phases and measured signal phases. The parallel shift and/or information from which the parallel shift may be determined may be provided to the transmitting apparatus. The receiving apparatus may use the parallel shift to determine a post-processing matrix for processing received signals. The transmitting apparatus may use the parallel shift to determine a precoder matrix for transmitting signals to the receiving apparatus. Other examples, however, may be implemented.

Items and/or techniques described herein may provide one or more of the following capabilities, as well as other capabilities not mentioned. Signal transfer losses due to parallel shift antenna misalignment may be reduced or eliminated. Accuracy of functions (e.g., communication, positioning, etc.) based on signal transfer between antennas may be improved. A spectral efficiency factor may be improved by compensating for parallel shift between transmitting and receiving antennas, e.g., for MIMO signal transfer. Throughput and/or reliability of information transmission/reception can be improved by compensating for parallel shift via beam steering and/or precoding. Other capabilities may be provided and not every implementation according to the disclosure must provide any, let alone all, of the capabilities discussed. A cause discussed above may not necessarily provide the indicated effect, and an effect noted above may be able to be realized by a different cause than a noted cause, if any.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, medical device, automobile, etc.) used by a user to communicate over a wireless communications network. A UE may be mobile or may (e.g., at certain times) be stationary, and may communicate with a Radio Access Network (RAN) or directly with another UE. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1B:
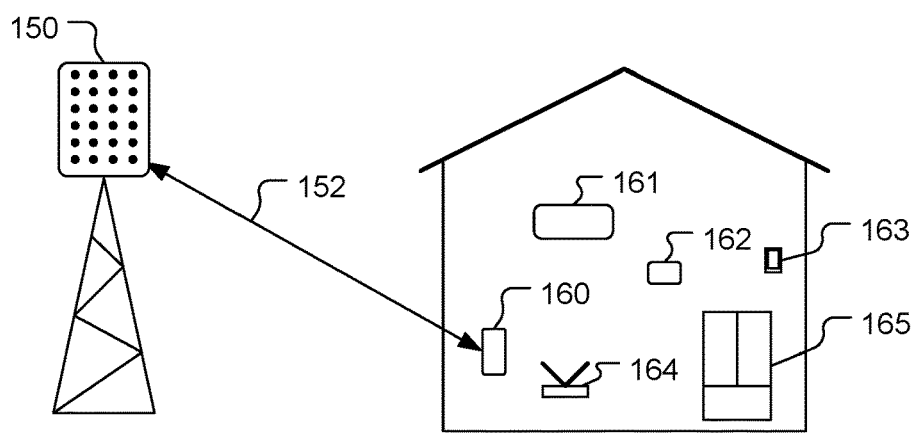
FIG. 1B is a simplified diagram of another example wireless communication network.
Figure 1C:
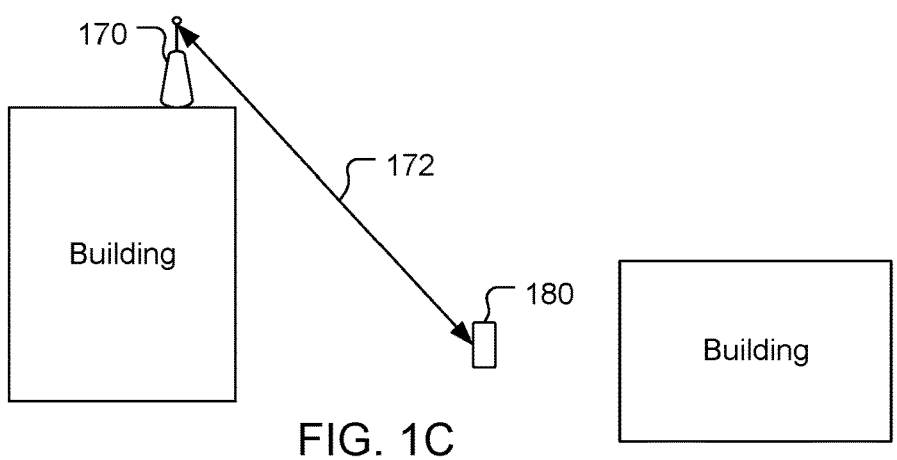
FIG. 1C is a simplified diagram of another example wireless communication network.

Referring to FIGS. 1A-1C, a wireless communication network may include base stations (BSs) that can support MIMO communication for a number of user equipments (UEs). A UE may communicate with a BS via downlink and uplink communication links. The downlink (or forward link) refers to the communication link from the BS to the UE, and the uplink (or reverse link) refers to the communication link from the UE to the BS. Examples of a base station include an Access Point (AP), a Network Node, a NodeB, an evolved NodeB (eNB), or a general Node B (gNodeB, gNB). For example, as shown in FIG. 1A, a base station 110 communicates with a base station 120 and a UE 130, and the base station 120 further communicates with a UE 140. As shown in FIG. 1B, a base station 150 communicates with a base station 160, here a consumer premises equipment (CPE) which may communicate with various devices of a consumer premises, e.g., in this example, a television 161, a portable computer 162, a smartphone 163, a relay 164, and a refrigerator 165. As shown in FIG. 1C, a base station 170 communicates with a CPE 180.

Line-of-sight (LOS) MIMO may provide high multiplexing gain under certain conditions. For example, one condition is that a distance between transmit (Tx) antenna and a receive (Rx) antenna, of a transmitter and a receiver respectively, is below a threshold distance that is a function of aperture size of the Tx and Rx antennas and a carrier frequency used by the transmitter and the receiver. Another condition is that the Tx antenna uses an accurate LOS MIMO precoder. To determine an accurate precoder, the transmitter may obtain knowledge of a channel between the transmitter and the receiver, a distance between the Tx antenna and the Rx antenna, and may determine misalignment compensation, i.e., compensation for misalignment of the Tx antenna relative to the Rx antenna.

There are multiple possible deployment scenarios for MIMO transmitters and receivers, three examples of which are shown in FIGS. 1A-1C. For example, LOS MIMO may be used in a backhaul link between a network node (e.g., gNB, IAB (integrated access and backhaul), SL UE (sidelink UE), etc.) and a relay (e.g., IAB, smart repeater, CPE, drone, etc.), such as a link 112 shown in FIG. 1A between the base station 110 (e.g., gNB) and the base station 120 (e.g., access point, repeater), or a link 152 shown in FIG. 1B or a link 172 shown in FIG. 1C. As another example, LOS MIMO may be used in an access link between a network node/relay and a UE, e.g., a link 114 between the base station 110 and the UE 130 or a link 122 between the base station 120 and the UE 140.

Figure 2:
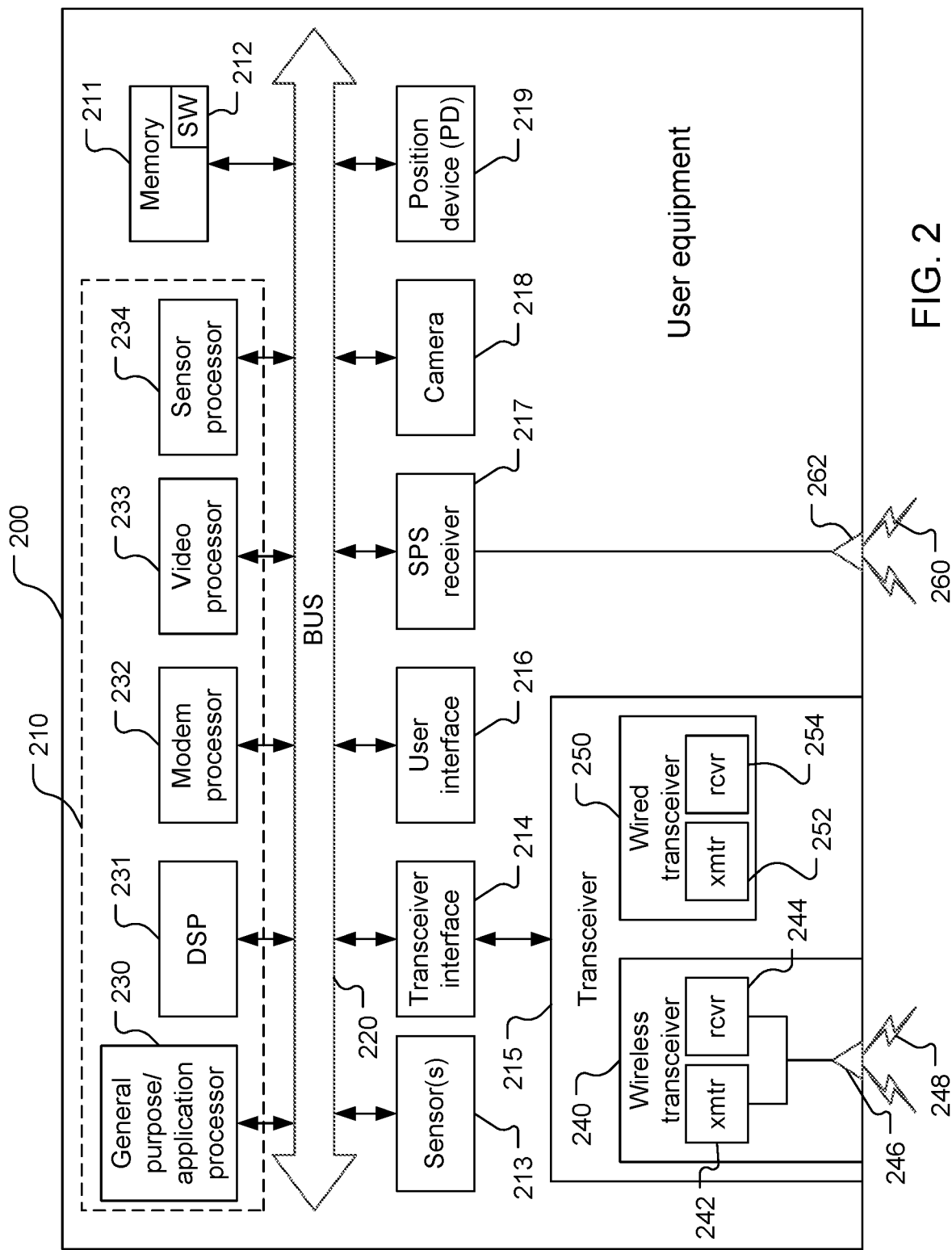
FIG. 2 is a block diagram of components of an example user equipment shown in FIG. 1.

Referring also to FIG. 2, a UE 200 is an example of one of the UEs 130, 140 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to a server (e.g., a Location Management Function (LMF)) regarding the mobility of the UE 200. For example, based on the information obtained/measured by the sensor(s) 213, the UE 200 may notify/report to the server that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs (transmission/reception points) and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (Vehicle-to-Everything) (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with a network such as an NG-RAN (Next Generation Radio Access Network) to send communications to, and receive communications from, the NG-RAN. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
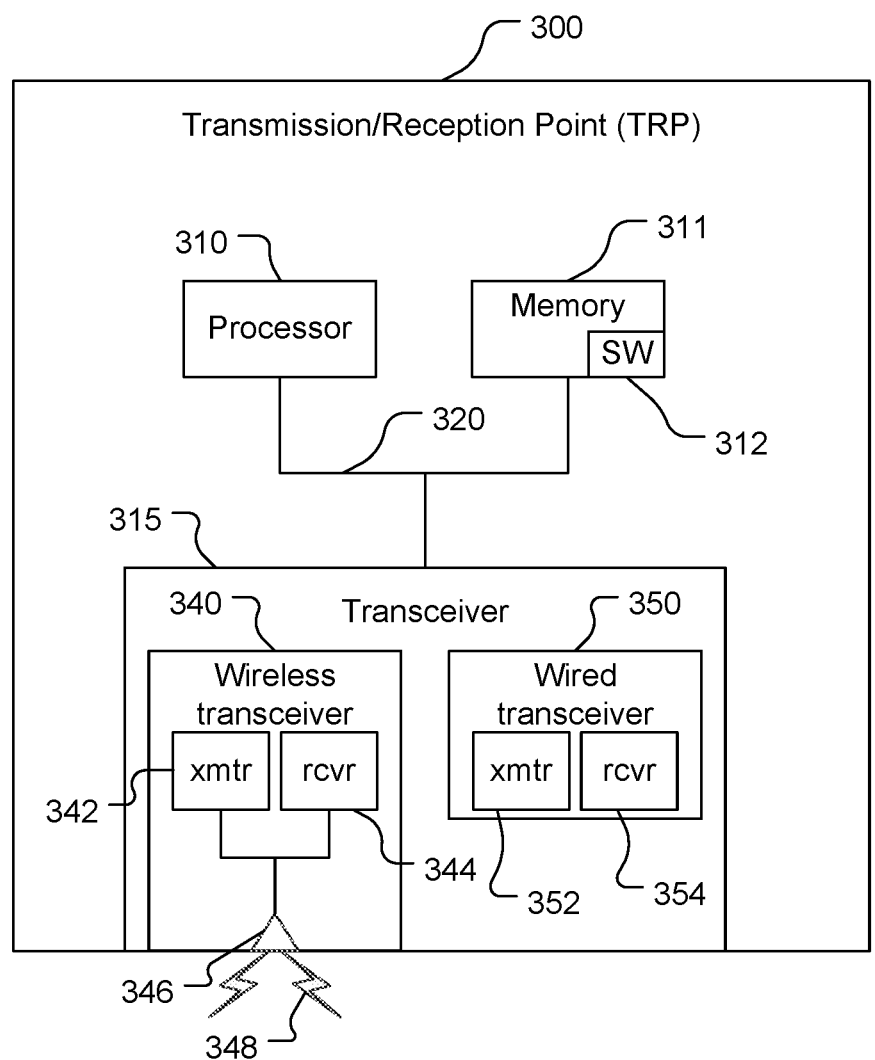
FIG. 3 is a block diagram of components of an example transmission/reception point.

Referring also to FIG. 3, an example of a TRP 300 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wired transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with an NG-RAN to send communications to, and receive communications from a server, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by another entity such as a server and/or the UE 200 (i.e., a server (e.g., an LMF) and/or the UE 200 may be configured to perform one or more of these functions). The TRP 300 may be representative of or an implementation of a CPE, or base station or other infrastructure communication device (e.g., within a backhaul of a network), or another device described above with respect to any of FIGS. 1A-1C.

Figure 4:
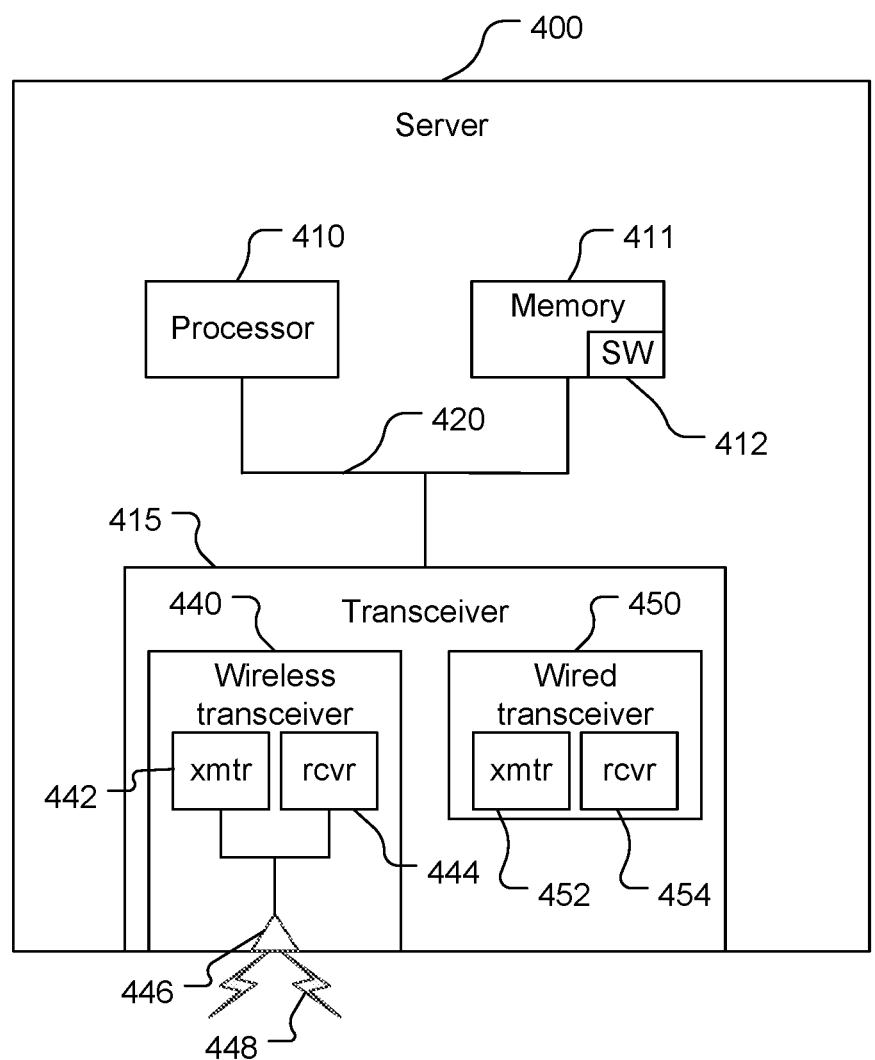
FIG. 4 is a block diagram of components of an example server.

Referring also to FIG. 4, a server 400, (e.g., an LMF), comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with an NG-RAN to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
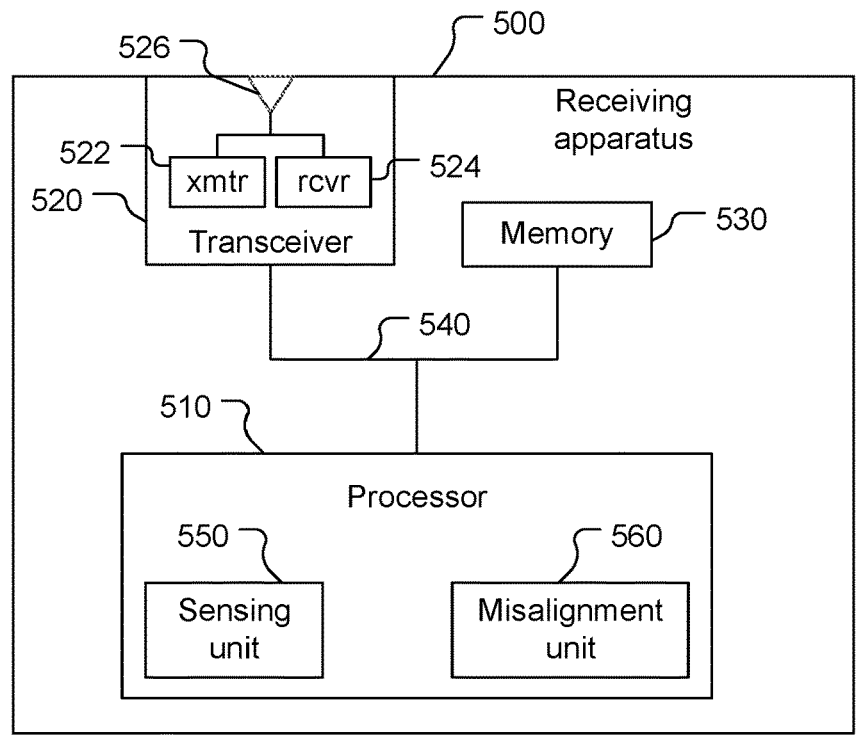
FIG. 5 is a simplified block diagram of an example receiving apparatus.

Referring also to FIG. 5, a receiving apparatus 500 includes a processor 510, a transceiver 520, and a memory 530 communicatively coupled to each other by a bus 540. The receiving apparatus 500 may be, for example, a UE or a network entity. The transceiver 520 includes a wireless transmitter 522, a wireless receiver 524, and an antenna 526 (which may include one or more antennas). The receiving apparatus 500 may include the components shown in FIG. 5 and may, for example, include one or more other components such as any of those shown in FIG. 2 such that the UE 200 may be an example of the receiving apparatus 500. For example, the processor 510 may include one or more of the components of the processor 210 and/or the transceiver 520 may include one or more of the components of the transceiver 215, e.g., the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions. Alternatively, the receiving apparatus 500 may, for example, include one or more other components such as any of those shown in FIG. 3 such that the TRP 300 may be an example of the receiving apparatus 500. For example, the processor 510 may include one or more of the components of the processor 310. The transceiver 520 may include one or more of the components of the transceiver 315, e.g., the wireless transmitter 342, the wireless receiver 344, and the antenna 346. Also or alternatively, the transceiver 520 may include the wired transmitter 352 and/or the wired receiver 354. The memory 530 may be configured similarly to the memory 311, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the receiving apparatus 500 performing a function as shorthand for one or more appropriate components (e.g., the processor 510 and the memory 530) of the receiving apparatus 500 performing the function. The processor 510 (possibly in conjunction with the memory 530 and, as appropriate, the transceiver 520) includes a sensing unit 550 and a misalignment unit 560. The sensing unit 550 and the misalignment unit 560 are discussed further below, and the description may refer to the processor 510 generally, or the receiving apparatus 500 generally, as performing any of the functions of the sensing unit 550 or the misalignment unit 560. The receiving apparatus 500 is configured to perform the functions of the sensing unit 550 and the misalignment unit 560 discussed herein. The misalignment unit 560 may include one or more further components (e.g., one or more sensors, a user interface, a position device, and/or an SPS receiver) to help determine misalignment of the antenna 246 and another antenna (e.g., of a TRP). For example, one or more features may be included in the receiving apparatus 500 to determine a location and orientation of the antenna relative to a reference coordinate system (e.g., a global coordinate system), and this location and orientation may be used to determine the orientation relative to another antenna.

Figure 6:
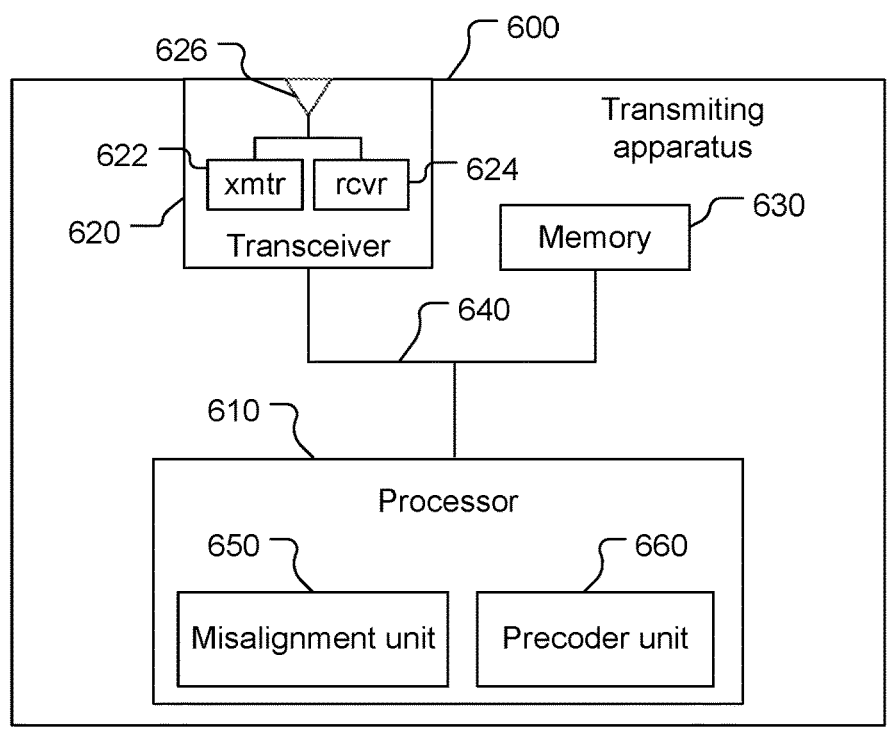
FIG. 6 is a simplified block diagram of an example transmitting apparatus.

Referring also to FIG. 6, a transmitting apparatus 600 includes a processor 610, a transceiver 620, and a memory 630 communicatively coupled to each other by a bus 640. The transmitting apparatus 600 may be, for example, a network entity. The transceiver 620 includes a wireless transmitter 622, a wireless receiver 624, and an antenna 626 (which may include one or more antennas). The transmitting apparatus 600 may include the components shown in FIG. 6 and may include one or more other components such as any of those shown in FIG. 3 and/or FIG. 4 such that the TRP 300 and/or the server 400 may be an example of the transmitting apparatus 600. For example, the processor 610 may include one or more of the components of the processor 310 and/or the processor 410. The transceiver 620 may include one or more of the components of the transceiver 315 (e.g., the wireless transmitter 342, the wireless receiver 342, and the antenna 346, as shown) and/or the transceiver 415. The memory 630 may be configured similarly to the memory 311 and/or the memory 411, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the transmitting apparatus 600 performing a function as shorthand for one or more appropriate components (e.g., the processor 610 and the memory 630) of the transmitting apparatus 600 performing the function. The processor 610 (possibly in conjunction with the memory 630 and, as appropriate, the transceiver 620) includes a misalignment unit 650 and a precoder unit 660. The misalignment unit 650 and the precoder unit 660 are discussed further below, and the description may refer to the processor 610 generally, or the transmitting apparatus 600 generally, as performing any of the functions of the misalignment unit 650 or the precoder unit 660. The transmitting apparatus 600 is configured to perform the functions of the misalignment unit 650 and the precoder unit 660 discussed herein. The misalignment unit 650 may include one or more further components (e.g., one or more sensors, a user interface, a position device, and/or an SPS receiver) to help determine misalignment of the antenna 246 and another antenna (e.g., the antenna 526 of the receiving apparatus 500, e.g., a UE, a CPE, a relay, etc.). For example, one or more features may be included in the network entity to determine a location and orientation of the antenna relative to a reference coordinate system (e.g., a global coordinate system), and this location and orientation may be used to determine the orientation relative to another antenna. The transmitting apparatus 600 may receive signals, and is referred to as a transmitting apparatus because the transmitting apparatus 600 transmits one or more pilot signals for determining parallel shift. Similarly, the receiving apparatus 500 may transmit signals, and is referred to as the receiving apparatus because the receiving apparatus 500 receives the one or more pilot signals. In some examples, the receiving apparatus 500 and the transmitting apparatus 600 switch roles at least once during operation or intermittently (e.g., periodically), for example with the transmitting apparatus 600 initially transmitting one or more pilot signals and the receiving apparatus 500 initially receiving the one or more pilot signals, followed by the receiving apparatus 500 thereafter transmitting another pilot signal(s) and the transmitting apparatus 600 thereafter receiving the other pilot signal(s).

The receiving apparatus 500 and the transmitting apparatus 600 may be configured for receiving and transmitting signals at any of a variety of frequency ranges. For example, the antennas 526, 626 may be configured to transduce millimeter-wave signals, e.g., with frequencies in the 20's of GHz, or in the 30's of GHz, or in the 40's of GHz, or in the 50's of GHz, or in the 60's of GHz, or higher frequencies, e.g., on the order of 150 GHz, or even higher frequencies such as sub-terahertz (THz) frequencies. These frequencies are examples, and the antennas 526, 626 may be configured to transduce signals of other frequencies.

Figure 7:
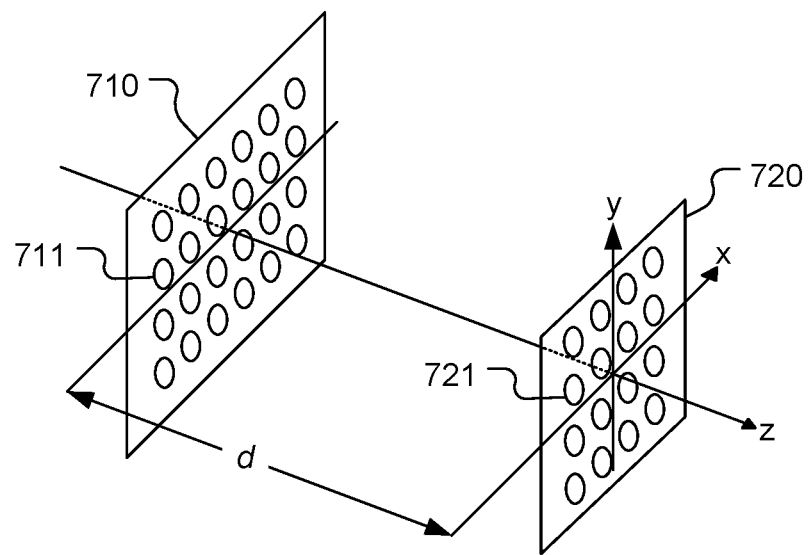
FIG. 7 is a perspective view of aligned antennas of a transmitting apparatus and a receiving apparatus.

Referring also to FIG. 7, a first antenna 710 and a second antenna 720 may be used for communication, e.g., LOS MIMO (LSM) communication or MMIMO (Massive MIMO) communication. The first antenna 710 is considered to be a transmit antenna and the second antenna 720 is considered to be a receive antenna, but these roles may change (e.g., reverse) over time and may do so multiple times. The first antenna 710 includes first antenna elements 711 and the second antenna 720 includes second antenna elements 721. In this example, the first antenna elements 711 are disposed in a 4×6 array (four rows and six columns) and the second antenna elements 721 are disposed in a 4×4 array. These are examples and other antenna element configurations may be used, e.g., a one-dimensional array, or other two-dimensional arrays such as a circular array for LSM, a grid array of different dimensions for LSM or MMIMO (i.e., other than 4×6 or 4×4 such as 16×16, 32×32, 64×64, 32×64, etc., e.g., for CPE applications, base station applications, etc., e.g., as shown in FIGS. 1A-1C), etc. Various types of antenna beams may be implemented by the antennas 710, 720, e.g., steered beams produced by phased arrays, Orbital Angular Momentum (OAM) beams, linearly polarized beams, circularly polarized beams, etc. The antennas 710, 720 are separated by a distance d and can communicate over a channel between the antennas 710, 720.

Various implementations of signal and/or waveform design (at the PHY, MAC, etc., layers, or based on other components or aspects) may be used to promote communication between the first antenna 710 and the second antenna 720. For example, beam width may be selected, jointly or independently, for each of the first antenna 710 and the second antenna 720. As another example, a certain path may be selected for signals being communicated between the first antenna 710 and the second antenna 720. For example, a direct path may selected, or a path in which signals are reflected off of one or more objects between being transmitted by the first antenna 710 and received by the second antenna 720 (based on knowledge of the geometry of the antennas 710, 720, information about a map or landscape in which the antennas 710, 720 are located, information about a path loss or other signal measurements, etc.) may be selected. Some such implementations may be affected by adjusting phase and/or gain of the first antenna elements 711 and/or the second antenna elements 721, for example as stored in a codebook for the antenna elements.

In some examples, a Rician channel model may be used. An example of a Rician channel model is given by $$H = aH_{LOS} + bH_{NLOS} \quad (1)$$

$$H_{LOS} \propto \frac{\exp\left(-j2\pi \frac{r_{ik}}{\lambda}\right)}{\frac{r_{ik}}{\lambda}} \quad (2)$$

$$H_{NLOS} \in \{i.i.d. \text{ Rayleigh}, CDL\text{-}x, TDL\text{-}x\} \quad (3)$$

$$a^2 + b^2 = 1 \quad (4)$$

where $H_{LOS}$ is a line-of-sight channel component, $H_{NLOS}$ is a non-line-of-sight channel component, $r_{ik}$ is a distance between a kth antenna element of one of the antennas 710, 720 and an $i^{th}$ antenna element of the other of the antennas 710, 720, and $a^2$ is the LOS percentage. $H_{LOS}$ is deterministic and a function of the distance d between the antennas 710, 720 and placement of the antennas 710, 720. For LSM, there is a strong LOS component of the channel matrix, with a>>b such that $H_{NLOS}$ may be ignored, eliminating (or at least rendering insignificant) the randomness of the NLOS channel component. The distance d may be determined in one or more of a variety of manners (e.g., from provided locations of the antennas 710, 720, from analysis of received signal power, from analysis of round-trip time between the antennas 710, 720, from locations of the antennas 710, 720 determined using one or more Satellite Positioning Systems, etc.). Knowing the separation distance d and the physical layouts of the antennas 710, 720, the channel matrix may be determined using Equations (1) and (2) if the misalignment of the antennas 710, 720 can be determined, because the misalignment affects the pairwise distances r. Further, in LSM, an SVD (singular value decomposition) based precoder is implicit, benefitting from the special structure of the channel having limited or no CSF (channel state feedback). An SVD-based precoder may be approximated by less-complex functions due to the highly-deterministic nature of the channel. This is also observed in Equations (10) and (11) below in that explicit computation of the SVD may not be performed every time a parallel shift changes, but rather the U and V matrixes may be updated by simple phase rotations based on a parallel shift vector. The structure of LSM channel can be exploited to achieve high multiplexing gain (e.g., see Equation (2)), which depends on antenna element spacings in antenna arrays and the separation distance d of the antennas 710, 720, even with a strong LOS component.

Figure 8:
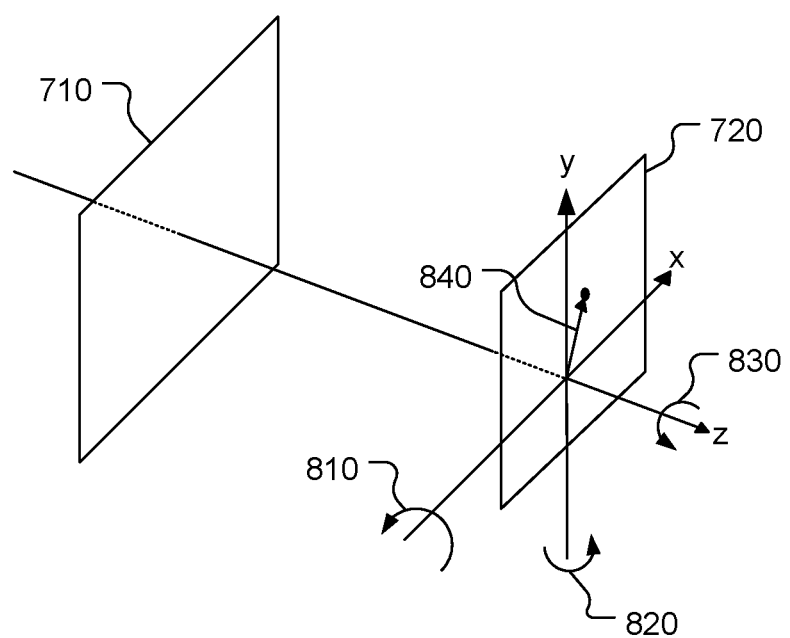
FIG. 8 is a perspective view of antennas of the transmitting apparatus and the receiving apparatus with a parallel shift of the antenna of the receiving apparatus in both an x-dimension and a y-dimension relative to the antenna of the transmitting apparatus.

Misalignment of the antennas 710, 720 may significantly degrade performance (relative to perfect alignment) depending on the type and amount of misalignment, both when a Rician channel model is used and when other channel models are used, or when a different strategy for determining a codebook or selecting communication parameters is used. Misalignment losses (e.g., due to signal reception in an off-boresight direction), however, may be reduced (e.g., even substantially eliminated) if the misalignment can be estimated and compensation provided for the estimated misalignment. Performance based on signal transfer between the antennas 710, 720, e.g., for communication, positioning, etc., may be improved by compensating for misalignment. e.g., by determining and applying a precoder matrix to signals transmitted by the first antenna 710 and/or determining and applying a post-processing matrix to signals received by the second antenna 720 in certain examples. Other methods of compensating for misalignment may be used such as mechanical adjustment of alignment of antennas (e.g., by a technician or a user (e.g., of a UE), or by a motor-driven device such as a servo, etc.). Compensating for the misalignment may reduce one or more effects of the misalignment or may counteract (e.g., partially or fully correct) the misalignment. Misalignment of the antennas 710, 720 may be rotational and/or translational (referred to as parallel shift). For example, referring also to FIG. 8, relative to the first antenna 710, the second antenna 720 may be rotated about the x-axis (called x-axis perpendicular rotation) as shown by an arrow 810, rotated about the y-axis (called y-axis perpendicular rotation) as shown by an arrow 820, and/or rotated about the z-axis (called parallel rotation) as shown by an arrow 830. Also or alternatively, relative to the first antenna 710, the second antenna may have a parallel shift along the x-axis and/or the y-axis, resulting in a parallel shift vector 840 (also called $\vec{\Delta}$).

The misalignment unit 650 of the transmitting apparatus 600 is configured to provide one or more pilot signals to the receiving apparatus 500 to help determine the parallel shift misalignment of the receiving apparatus 500 with respect to an antenna of the transmitting apparatus 600. For example, the misalignment unit 650 may cause different antenna elements to send different signals and provide information to the receiving entity regarding the different signals such that the receiving entity can determine the parallel shift of the receiving antenna relative to the transmitting antenna. The information regarding the transmitted signals enables the receiving entity (and/or another entity) to differentiate between one or more signals received by one portion of the receiving antenna and one or more other signals received by another portion of the receiving antenna. The information regarding the transmitted signals may be used to identify one or more linear displacements of a reference point (e.g., a center) of the receiving antenna relative to one or more reference lines separating one portion of the transmitting antenna (e.g., one or more first antenna elements of the transmitting antenna) from another portion of the transmitting antenna (e.g., one or more second antenna elements of the transmitting antenna) corresponding to the received signals.

Figure 9A:
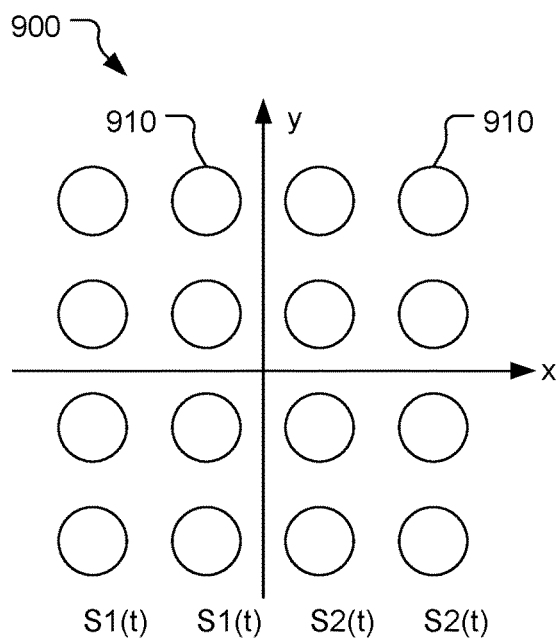
FIG. 9A illustrates signals transmitted by different portions (here columns) of an antenna of a transmitting apparatus.
Figure 9B:
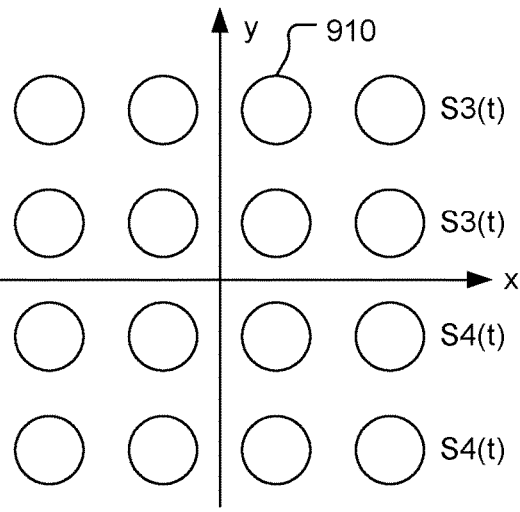
FIG. 9B illustrates signals transmitted by different portions (here rows) of the antenna of the transmitting apparatus.

Referring also to FIGS. 9A and 9B, an example transmitting antenna 900 that includes antenna elements 910 is illustrated. In this example, the antenna elements 910 are disposed in a two-dimensional array, more particularly in a grid of rows and columns, and more particularly in a 4×4 array. Other configurations of antenna elements may be used, e.g., a circular array (with antenna elements disposed along a circle), arrays of dimensions other than 4×4, etc.

The misalignment unit 650 may cause signals to be transmitted by the antenna elements to distinguish different portions of the antenna 900, e.g., relative to reference lines. Each of the antenna elements 910 may transmit a respective signal, and different portions of the antenna elements 910 may transmit signals that may be distinguished from each other. For example, as shown in FIG. 9A, the misalignment unit 650 may cause the antenna elements 910 on either side of a separator line, here the y-axis, to transmit different signals, with the y-axis being a reference line, to help estimate the parallel shift in the x-axis. In this example, the misalignment unit 650 causes the antenna elements 910 to the left of the y-axis to transmit the same signal, here a first signal $S1(t)$, and cause the antenna elements 910 to the right of the y-axis to transmit the same signal, here a second signal $S2(t)$, that is different from the first signal $S1(t)$, with the signals $S1(t)$, $S2(t)$ comprising a pilot signal. For example, the second signal $S2(t)$ may have a different phase than the first signal $S1(t)$, and/or may differ from the first signal $S1(t)$ in one or more other ways that may be detected. The second signal $S2(t)$ may, for example, have substantially the same amplitude as the first signal $S1(t)$ (e.g., an amplitude with an amplitude within 20% of the amplitude of the signal S(t)) and a significantly different phase than the first signal $S1(t)$ (e.g., more than 20° phase difference with respect to the first signal $S1(t)$). The second signal $S2(t)$ may have a phase that is substantially opposite the phase of the first signal $S1(t)$, e.g., a phase between 160° and 200° different from the first signal $S1(t)$. For example, the second signal $S2(t)$ may be the first signal $S1(t)$ with opposite phase such that $S2(t)=-S1(t)$. The amplitudes of the signals $S1(t)$, $S2(t)$ may vary over time, e.g., with the signals $S1(t)$, $S2(t)$ being sinusoidal signals, and/or being amplitude modulated signals. The signals $S1(t)$ and $S2(t)$ may be transmitted at separate times in a time division multiplexed fashion with a time separation, if any, between the end of transmission of the first signal $S1(t)$ and the beginning of transmission of the second signal $S2(t)$ being less than a threshold amount of time (e.g., 10 ms). At a different time, the misalignment unit 650 may cause the antenna elements 910 to transmit different signals relative to a different reference line. For example, as shown in FIG. 9B, the misalignment unit 650 may cause the antenna elements 910 on either side of another separator line, here the x-axis, to transmit different signals, with the x-axis being another reference line, to help estimate the parallel shift in the y-axis. In this example, the misalignment unit 650 causes the antenna elements 910 above the x-axis to transmit a third signal $S3(t)$ and causes the antenna elements 910 below the x-axis to transmit a fourth signal $S4(t)$ that is different from the third signal $S3(t)$, with the signals $S3(t)$, $S4(t)$ comprising another pilot signal. The third and fourth signals $S3(t)$, $S4(t)$ may be the same as the first and second signals $S1(t)$, $S2(t)$ or vice versa, or one of the third and fourth signals $S3(t)$, $S4(t)$ may be the same as one of the first and second signals $S1(t)$, $S2(t)$, or the third and fourth signals $S3(t)$, $S4(t)$ may be the different from the first and second signals $S1(t)$, $S2(t)$. The signals $S3(t)$ and $S4(t)$ may be transmitted substantially concurrently. In the example illustrated in FIGS. 9A and 9B, the reference lines are perpendicular, for example such that shift in multiple dimensions may be accurately determined.

The signal configurations shown and described with respect to FIGS. 9A and 9B are examples and other signal configurations may be used. For example, signal differences other than phase differences may be used. As another example, signal differences about other reference lines may be used. For example, different reference lines may not be perpendicular to each other. As another example, reference lines may not be perpendicular to an edge of an antenna array (e.g., may be diagonal or may be used with arrays having a shape other than rectangular) and/or may not bisect an antenna as the reference lines do in FIGS. 9A and 9B.

Figure 10A:
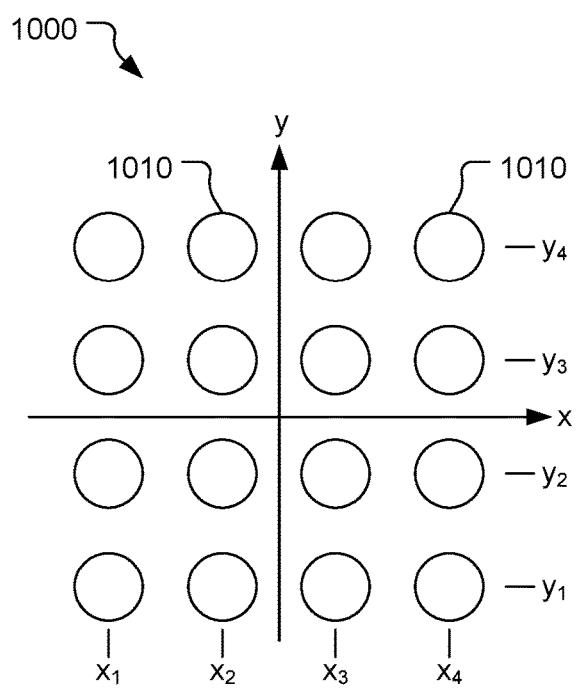
FIG. 10A illustrates signals received by different portions (here columns) of an antenna of a receiving apparatus that is aligned with an antenna of a transmitting apparatus.
Figure 10B:
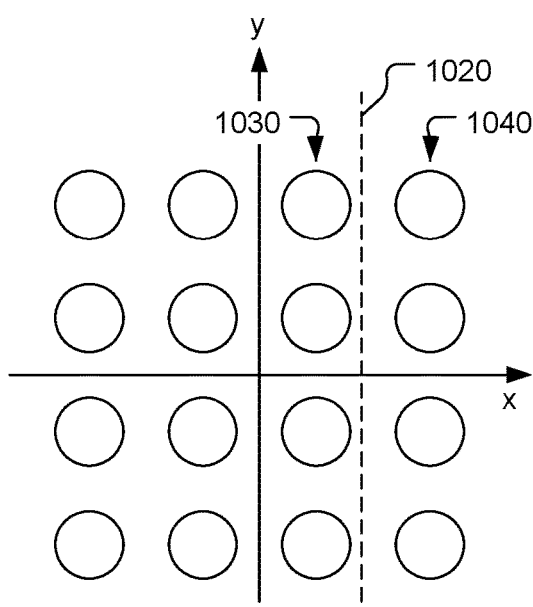
FIG. 10B illustrates signals received by different portions (here columns) of an antenna of the receiving apparatus that is offset along an x-axis relative to an antenna of a transmitting apparatus.

Referring also to FIGS. 10A and 10B, signals transmitted by the transmitting apparatus 600 may be received by antenna elements 1010 of the antenna 526 of the receiving apparatus 500 and measured to determine one or more linear parallel offsets of the antenna 526 of the receiving apparatus relative to the antenna 626 of the transmitting apparatus 600. For example, the first signal $S1(t)$ and the second signal $S2(t)$ are transmitted concurrently. The antenna elements 1010 receive a combination of the first and second signals. The sensing unit 550 may measure the phase of the combined signal received at each of the antenna elements 1010. The misalignment unit 560 may determine a phase difference between adjacent antenna elements in the x-direction and/or the y-direction. For example, to determine a phase jump along the x-axis, with the antenna elements 1010 being disposed at four x-axis locations ($x_1$, $x_2$, $x_3$, $x_4$) and four y-axis locations ($y_1$, $y_2$, $y_3$, $y_4$) as shown, the misalignment unit 560 may compute the phase difference between the antenna elements 1010 at $x_1$ and $x_2$, between the antenna elements 1010 at $x_2$ and $x_3$, and between the antenna elements 1010 at $x_3$ and $x_4$. For example, the misalignment unit 560 may determine phase differences between adjacent antenna elements at $x=x_1$ and antenna elements at $x=x_2$, i.e., in this example:

$$\Delta phase1 = phase(x_1, y_1) - phase(x_2, y_1) \qquad (5)$$

$$\Delta phase2 = phase(x_1, y_2) - phase(x_2, y_2) \qquad (6)$$

$$\Delta phase3 = phase(x_1, y_3) - phase(x_2, y_3) \qquad (7)$$

$$\Delta phase4 = phase(x_1, y_4) - phase(x_2, y_4) \qquad (8)$$

where phase($x_n$, $y_m$) is the phase measured by the antenna element 1010 at position $x_n$, $y_m$. The misalignment unit 560 may determine the average of differences (1)-(4). This average corresponds to the phase difference between $x=x_1$ and $x=x_2$. This process may be repeated to determine the phase difference between each pair of adjacent columns of the antenna elements 1010. The misalignment unit 560 may analyze the phase difference averages to determine a phase difference exceeding a threshold phase difference, which may be called a phase jump. The misalignment unit 560 may determine the location of the phase jump, if any, as the parallel shift transverse to a line of separation of transmitted signal characteristic(s), in this case along the x-axis (as the transmitted signals had different phases separated by the y-axis). A similar procedure may be performed to determine the parallel shift, if any, along the y-axis. This is an example, and other implementations are possible (e.g., determining parallel shifts along other directions). While this discussion focused on phase differences, one or more signal characteristics other than phase (that can be used to distinguish offset signal reception) may be used instead of or in addition to phase to determine a parallel offset.

As shown in FIG. 10A, with the antenna 526 having no parallel shift relative to the antenna 626, a phase jump in received signals occurs between the antenna elements 1010 to the left of the y-axis and the antenna elements to the right of the y-axis. As shown in FIG. 10B, the transmitting and receiving antennas are misaligned along the x-axis by an amount indicated by an offset line 1020. The misalignment unit 560 may, in this example, determine that a phase jump (disparity) occurs between columns 1030, 1040 of the antenna elements 1010. The parallel shift is thus the linear offset of the determined offset line 1020 relative to a reference point, e.g., a center (where the x-axis and y-axis meet), of the antenna 1000 (i.e., the shortest distance from the reference point to the distinction line). For example, the misalignment unit 560 may assume that the phase jump occurs midway between columns 1030, 1040. A vertical parallel offset may be determined in a similar manner. The misalignment unit 560 may determine the phase jump location with a resolution of a separation of the antenna elements 1010, and with a magnitude up to, in this example, half a width of the antenna 1000 and half a height of the antenna 1000. The two linear parallel shifts may be combined to determine a two-dimensional parallel shift vector $\vec{\Delta}$, e.g., the parallel shift vector 840, relative to two directions (e.g., two axes). The phase-jump based misalignment determination is robust to both channel and beam models.

The transmitting apparatus 600, e.g., the misalignment unit 650, may be configured to provide one or more indications of the one or more pilot signals to be sent by the transmitting apparatus 600 to the receiving apparatus 500. For example, the transmitting apparatus 600 may send an RRC message indicating the type(s) of the pilot signal(s) to be sent and possibly timing of the pilot signal(s) to be sent. The type(s) may be indicated by a characteristic of x-axis disparity, y-axis disparity, phase disparity, etc., or an appropriate combination of multiple characteristics (e.g., x-axis phase disparity and y-axis phase disparity). The misalignment unit 650 may be configured to transmit the pilot signal(s) based on a separation of the apparatus 500, 600 being below a threshold distance. The separation being below the threshold distance may trigger transmission of the pilot signal(s) by the transmitting apparatus 600 and transmission of the indication(s) of the pilot signal type(s) and possibly timing.

Figure 11:
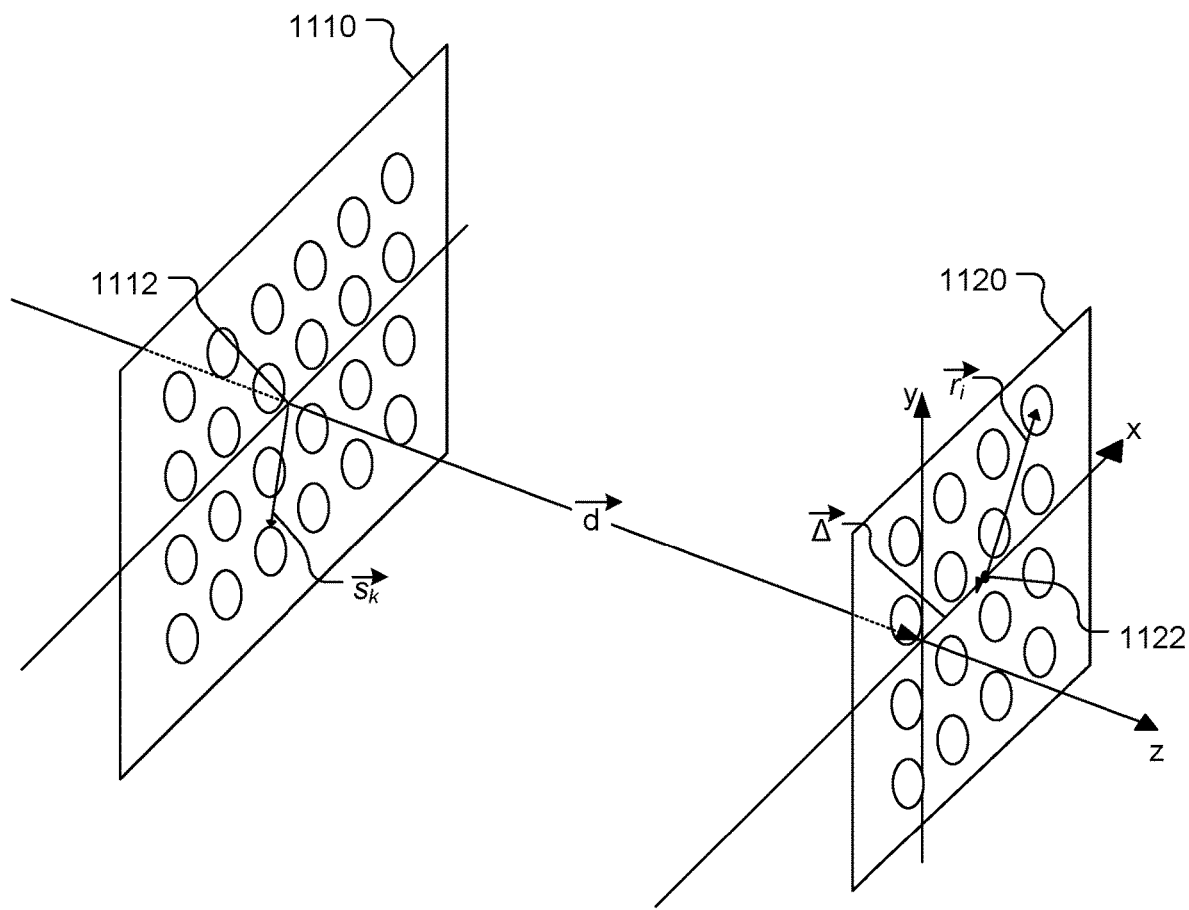
FIG. 11 is a perspective view of antennas of the transmitting apparatus and the receiving apparatus with a parallel shift of the antenna of the receiving apparatus in an x-dimension relative to the antenna of the transmitting apparatus.

Referring also to FIG. 11, a precoder matrix and/or a post-processing matrix may be updated based on parallel shift misalignment of antennas 1110, 1120. The antennas 1110, 1120 are the same as the antennas 710, 720, with only a positive x-axis parallel shift of the antenna 1120 relative to the antenna 1110. A vector $\vec{\Delta}$ shows the parallel shift of the antenna 1120 relative to the antenna 1110. A distance vector $\vec{d}$ shows the direction and distance of a center 1122 of the antenna 1120 from a center 1112 of the antenna 1110. Vectors $\vec{s}_k$ and $\vec{r}_i$ are local vectors from the centers 1112, 1122 to respective antenna elements k, i. The precoder and post-processing matrixes may be used to reduce or eliminate inter-stream interference in MIMO transmissions. The SVD decomposition of a channel matrix, H, is given by $$H = U*S*V'\qquad(9)$$

where S is a diagonal matrix where diagonal entries are singular values (corresponding to the signal strength at each data stream (data layer)), V' is the Hermitian of the precoder matrix V, which is the SVD-based precoder. Each column of the precoder matrix V corresponds to a data layer that is precoded with a corresponding column of the precoder matrix V and transmitted. For example, if there are two data layers (streams) x1, x2, and the first two columns of the precoder matrix V are denoted V1, V2, then V1*x1+V2*x2 is transmitted by transmit antennas and is of size Nt by 1 (where Nt is the number of transmit antennas, and x1 and x2 are single symbols (for longer streams, this procedure is repeated for every symbol)). Using this precoder, since V'*V=I (the identity matrix), the receiver can apply the post-processing matrix as U'*y to separate the layers (to reduce or eliminate the inter-stream interference in MIMO transmissions). Instead of the actual channel matrix H, an estimated channel matrix Ĥ may be used. The sensing unit 550 may be configured to update the post-processing matrix U according to $$U_{ik}^{new} = U_{ik} e^{-j\frac{2\pi(\vec{r}_i \cdot \vec{\Delta})}{\lambda \|\vec{d}\|}} \text{ for } i, k = 1, 2, \ldots, N \qquad(10)$$

where $U_{ik}$ is the prior post-processing matrix (with an initial post-processing matrix determined using a standard technique, e.g., based on signal measurements), $\lambda$ is the wavelength of signals transmitted by the transmitting apparatus 600, $\vec{r}_i$ is a vector from the center 1122 of the antenna 1120 to the $i^{th}$ antenna element of the antenna 1120, and $\vec{\Delta}$ is a vector of the parallel shift (displacement). A standard technique for determining the U matrix is the singular value decomposition of the estimated channel matrix, which may be obtained based on signal measurements. The U matrix may be composed of the left singular vectors of the estimated channel matrix. The receiver side can apply a post processing matrix as U'*y, where U is the Hermitian transpose of U and y is the received signal. If U is the post processing matrix in the perfectly aligned case, then $U^{new}$ (the post processing matrix under misalignment) can be obtained by applying phase shifts to the rows of U Also or alternatively, the precoder unit 660 may be configured to update a precoder matrix V according to $$V_{ik}^{new} = V_{ik} e^{-j\frac{2\pi(\vec{s}_k \cdot \vec{\Delta})}{\lambda \|\vec{d}\|}} \text{ for } i, k = 1, 2, \ldots, N \qquad(11)$$

where $V_{ik}$ is the prior precoder matrix (with an initial precoder matrix determined using a standard technique, e.g., based on signal measurements), $\lambda$ is the wavelength of signals transmitted by the transmitting apparatus 600, $\vec{s}_k$ is a vector from the center 1112 of the antenna 1110 to the kth antenna element of the antenna 1110, and D is the vector of the parallel shift (displacement). The parallel shift can be compensated for at the transmitting apparatus 600 and the receiving apparatus 500 separately with beam steering. The compensation at the receiving apparatus 500 may be performed implicitly with an MMSE (minimum mean squared error) receiver. Instead of applying the post processing matrix U, a linear MMSE filter may be applied directly to the received signal using a channel matrix estimate than can be derived from the antenna apertures, distance between the transmit and receive antennas, and the parallel shift vector $\vec{\Delta}$. The misalignment unit 560 may send an indication of the parallel shift vector $\vec{\Delta}$ to the transmitting apparatus 600. Thus, it will be understood that the transmitting apparatus 600 and/or the receiving apparatus 500 may be configured to compensate for parallel shift (e.g., as determined by the misalignment unit 560 and/or 650) using any number of different strategies or methodologies.

Figure 12:
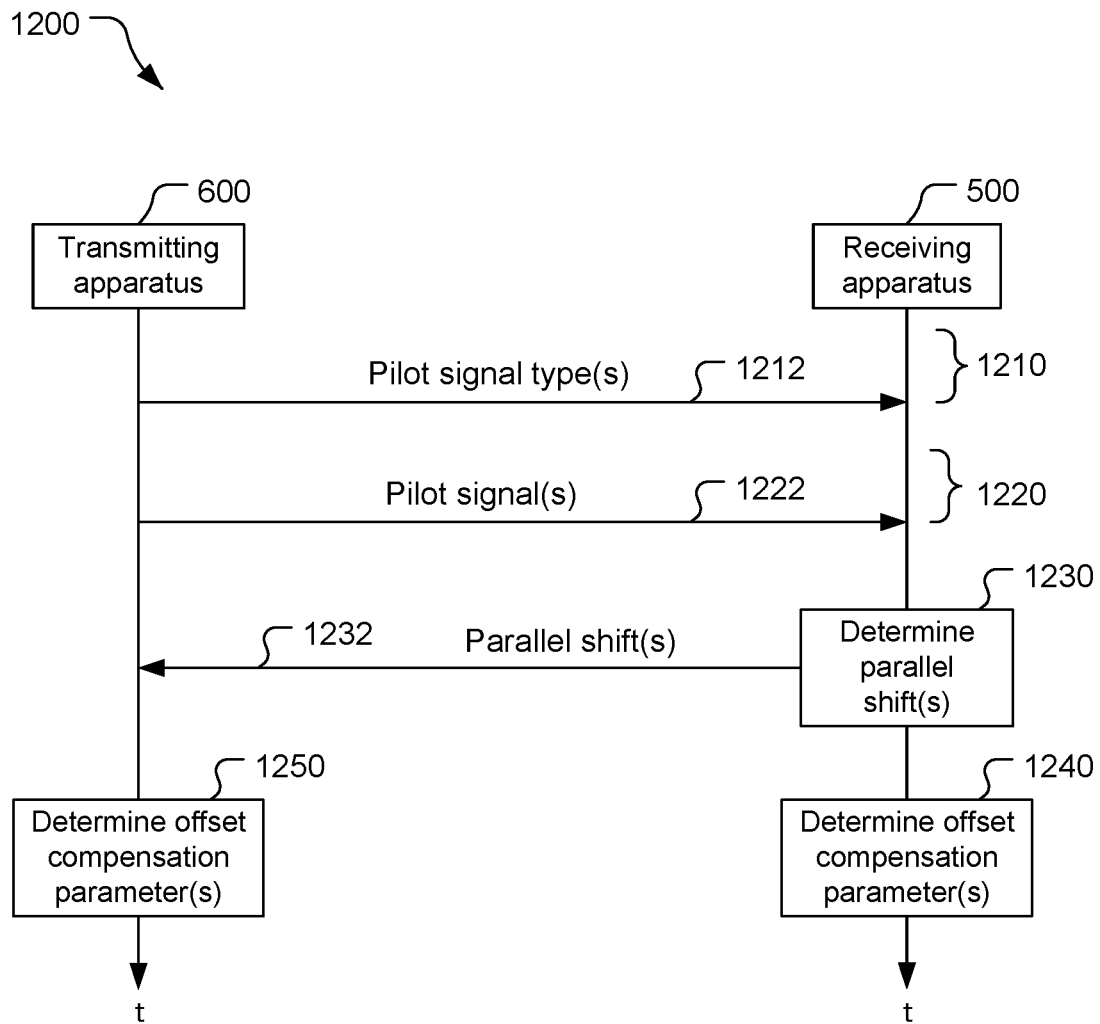
FIG. 12 is a signaling a process flow for parallel shift compensation.

Referring also to FIG. 12, a processing and signal flow 1200 for parallel shift compensation includes the stages shown. The flow 1200 is an example, and stages may be added to, removed from, and/or rearranged in, the flow 1200.

At stage 1210, the transmitting apparatus 600 transmits a pilot signal type message 1212 indicating the signal type of each of one or more pilot signals. The misalignment unit 650 may transmit one or more indications of one or more characteristics of signals making up the pilot signal(s), e.g., phase and possibly amplitude and/or one or more other characteristics. For example, the misalignment unit 650 may transmit one or more indications of phase disparities of pilot signals, e.g., that a pilot signal will be transmitted with a phase disparity about a horizontal separator line passing through a center of a transmitting antenna, and/or that another pilot signal will be transmitted with a phase disparity about a vertical separator line passing through the center of the transmitting antenna. The message 1212 may indicate an amount of phase disparity for a pilot signal with a phase disparity. The message 1212 may indicate timing of each indicated pilot signal, e.g., a future time at which a particular pilot signal will be transmitted. The message 1212 may indicate a type of signal disparity (e.g., phase disparity), and may indicate a geometry of the disparity (e.g., a direction of a separator line and location of a separator line relative to the transmitting antenna, e.g., relative to a reference point such as a center, a midpoint of a width, a midpoint of a height, a corner, etc.).

At stage 1220, the transmitting apparatus 600 transmits the one or more pilot signals 1222. For example, the misalignment unit 650 transmits the pilot signal(s) via the antenna 626 with characteristic(s) (e.g., phase, timing) indicated in the pilot signal type message 1212. The receiving apparatus 500, e.g., the sensing unit 550, receives and measures the pilot signal(s) 1222, e.g., to determine one or more relevant characteristics (e.g., phase) of signals received by antenna elements of the antenna 626.

At stage 1230, the receiving apparatus 500 determines the parallel shift(s) of the antenna 526 relative to the antenna 626. The receiving apparatus 500, e.g., the misalignment unit 560, analyzes the signal characteristic(s) of the signals received by the antenna elements of the antenna 526 and determines a distinction line of one or more signal characteristics received by the antenna 526 (e.g., a line on either side of which signals are received with one or more distinct characteristic values (e.g., of phase)), e.g., by determining the signal phase received by each antenna element of the antenna 526 and determining adjacent antenna elements with disparate received signal characteristic values. The misalignment unit 560 may determine a linear distance from a center of the antenna 526 to the distinction line (e.g., a shortest distance from the center to the distinction line) as a parallel shift along a corresponding direction (e.g., perpendicular to the distinction line). The misalignment unit 560 may determine multiple parallel shifts based on multiple pilot signals with signal disparities along different directions. The multiple parallel shifts may be combined to determine a parallel shift vector, e.g., the parallel shift vector 840 ($\vec{\Delta}$, as shown in FIG. 11). The receiving apparatus 500, e.g., the misalignment unit 560, may transmit a parallel shift message 1232 to the transmitting apparatus 600 (and/or to one or more other entities, e.g., the server 400) indicating the determined parallel shift(s), e.g., one or more one-dimensional parallel shift vectors or a two-dimensional parallel shift vector.

At stages 1240, 1250, the receiving apparatus 500 and the transmitting apparatus 600 may determine one or more compensation parameters to compensate for parallel shift between antennas. For example, at stages 1240, 1250 the receiving apparatus 500 and the transmitting apparatus 600 may determine one or more physical adjustment parameters for one or more antennas (e.g., one or more adjustment angles and/or one or more servo motor movements), or a post-processing matrix and a precoder matrix, respectively, for compensating for the parallel shift(s). For example, the misalignment unit 560 may determine an updated post-processing matrix according to Equation (10). The receiving apparatus 500, e.g., the sensing unit 550, may use the post-processing matrix to process received signals. The precoder unit 660 of the transmitting apparatus may receive the parallel shift message 1232 and use the indication(s) in the parallel shift message 1232 to determine an updated precoder matrix according to Equation (11). The transmitting apparatus 600 may use the precoder matrix to transmit signals to the receiving apparatus to help compensate for the parallel shift(s) of the antenna 526 relative to the antenna 626 to reduce losses due to parallel misalignment of the antennas 526, 626.

Figure 13:
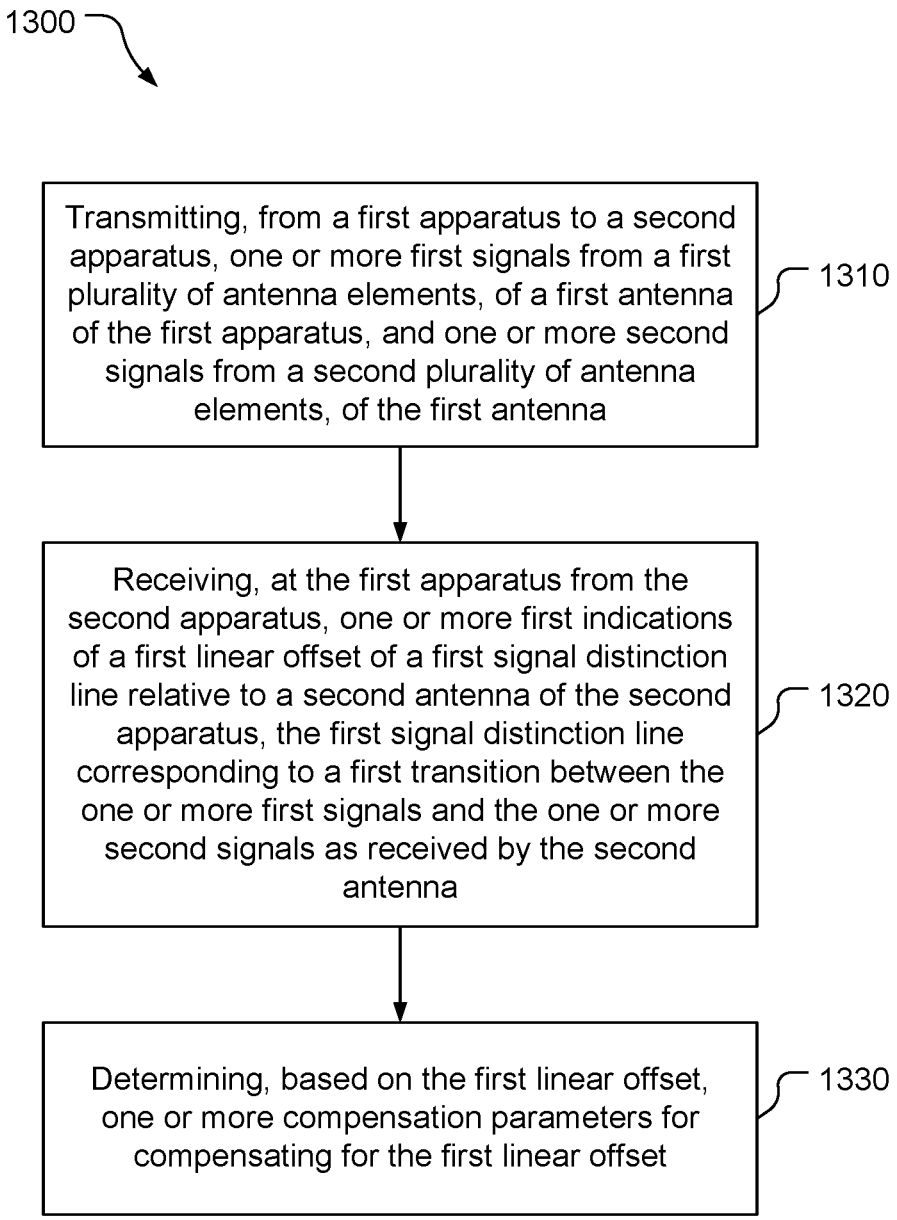
FIG. 13 is a block flow diagram of an antenna offset compensation determination method.

Referring to FIG. 13, with further reference to FIGS. 1-12, an antenna offset compensation determination method 1300 includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes transmitting, from a first apparatus to a second apparatus, one or more first signals from a first plurality of antenna elements, of a first antenna of the first apparatus, and one or more second signals from a second plurality of antenna elements, of the first antenna. For example, at stage 1220 the transmitting apparatus 600 transmits a pilot signal to the receiving apparatus 500 with the pilot signal comprising one or more signals sent from a first portion of the antenna 626 and one or more signals sent from a second portion of the antenna 626. For example, the first signal S1($t$) may be sent by the antenna elements 910 to the left of the y-axis and the second signal S2($t$) sent by the antenna elements 910 to the right of the y-axis. As another example, the third signal S3($t$) may be sent by the antenna elements 910 above the x-axis and the fourth signal S4($t$) sent by the antenna elements 910 below the x-axis (e.g., at a different time than the first and second signals are sent). The processor 610, possibly in combination with the memory 630, in combination with the transceiver 620 (e.g., the wireless transmitter 622 and the antenna 626) may comprise means for transmitting one or more first signals and one or more second signals.

At stage 1320, the method 1300 includes receiving, at the first apparatus from the second apparatus, one or more first indications of a first linear offset of a first signal distinction line relative to a second antenna of the second apparatus, the first signal distinction line corresponding to a first transition between the one or more first signals and the one or more second signals as received by the second antenna. For example, the transmitting apparatus may receive the parallel shift message 1232 indicating one or more linear offsets of a separator line (e.g., the offset line 1020) parallel shifts of the antenna 526 relative to the antenna 626. The one or more indications may, for example, be a single indication of magnitude and direction of offset. As another example, the one or more indications may be multiple indications of signal characteristic(s) received by each of multiple antenna elements of the antenna 526 (and indications of locations of the antenna elements). Still other indications may be provided. The processor 610, possibly in combination with the memory 630, in combination with the transceiver 620 (e.g., the wireless receiver 624 and the antenna 626) may comprise means for receiving the one or more first indications of a first linear offset.

At stage 1330, the method 1300 includes determining, based on the first linear offset, one or more compensation parameters for compensating for the first linear offset. For example, at stage 1250 the transmitting apparatus 600 determines one or more compensation parameters to counteract (e.g., partially or fully correct, or to adjust to) the linear offset. The compensation parameter(s) may include one or more physical antenna movements and/or a precoder matrix. The processor 610, possibly in combination with the memory 630, may comprise means for determining the one or more compensation parameters.

Implementations of the method 1300 may include one or more of the following features. In an example implementation, determining the one or more compensation parameters comprises determining a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements. For example, at stage 1250 the transmitting apparatus 600 determines the precoder matrix using Equation (11). In another example implementation, the one or more first signals are transmitted with a first phase and the one or more second signals are transmitted with a second phase that is different from the first phase. For example, the first signal S1(t) and the second signal S2(t) may be transmitted by the antenna 900 with the first signal S1(t) having a different phase than the second signal S2(t). In a further example implementation, each of the one or more first signals is a first reference signal and each of the one or more second signals is a second reference signal that is substantially equal in magnitude to the first reference signal and between 160° and 200° out of phase with respect to the first reference signal. For example, the first signal S1(t) may differ in phase from the second signal S2(t) by between 160° and 200°, e.g., by 180°.

Also or alternatively, implementations of the method 1300 may include one or more of the following features. In an example implementation, the method 1300 includes: transmitting, from the first apparatus to the second apparatus, one or more third signals from a third plurality of antenna elements, of the first antenna, and one or more fourth signals from a fourth plurality of the antenna elements; receiving, at the first apparatus from the second apparatus, one or more third indications of a second linear offset of a second signal distinction line relative to the second antenna of the second apparatus, the second signal distinction line corresponding to a second transition between the one or more third signals and the one or more fourth signals as received by the second antenna; and determining the one or more compensation parameters based further on the second linear offset, the one or more compensation parameters being further for compensating for the second linear offset. For example, the transmitting apparatus 600 can send another pilot signal, e.g., comprising the third and fourth signals sent by respective sets of the antenna elements 910, receive one or more additional offset indications of a distinction line corresponding to reception of the other pilot signal, and use the additional offset indication(s) to determine one or more compensation parameters (e.g., the precoder matrix (e.g., according to Equation (11)) and/or one or more antenna movements) to compensate for the second linear offset (e.g., in a direction substantially perpendicular to the first linear offset). The processor 610, possibly in combination with the memory 630, in combination with the transceiver 620 (e.g., the wireless transmitter 622 and the antenna 626) may comprise means for transmitting one or more third signals and one or more fourth signals. The processor 610, possibly in combination with the memory 630, in combination with the transceiver 620 (e.g., the wireless receiver 624 and the antenna 626) may comprise means for receiving the one or more second indications of a second linear offset. The processor 610, possibly in combination with the memory 630, may comprise means for determining the one or more compensation parameters based further on the second linear offset. In a further example implementation, the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular, and wherein the first plurality of antenna elements and the second plurality of antenna elements comprise the same antenna elements as the third plurality of antenna elements and the fourth plurality of antenna elements. For example, the transmitting apparatus 600 transmits the first and second signals S1(t), S2(t) from antenna elements on either side of the x-axis as the first separator line and transmits the third and fourth signals S3(t), S4(t) from antenna elements on either side of the y-axis as the second separator line such that two perpendicular linear offsets may be determined. The first and second separator lines are substantially perpendicular, e.g., intersecting with each other to form an angle between 80° and 100°. As a further example implementation, the first plurality of antenna elements and the second plurality of antenna elements are disposed symmetrically about the first separator line, and the third plurality of antenna elements and the fourth plurality of antenna elements are disposed symmetrically about the second separator line. For example, as shown in FIGS. 9A and 9B, the antenna 900 may be divided into symmetric portions for transmitting the different signals. In other examples, portions of an antenna transmitting different signals for determining parallel shift may not be symmetrically disposed about one or more separator lines (e.g., with different quantities of antenna elements on different sides of a separator line and/or with asymmetric locations of the antenna elements (such that the different sets of antenna elements are not mirror images).

Also or alternatively, implementations of the method 1300 may include one or more of the following features. In an example implementation, the method 1300 includes transmitting, from the first apparatus to the second apparatus, a distinction message distinguishing between the one or more first signals and the one or more second signals. For example, the transmitting apparatus 600 transmits the pilot signal type message 1212 providing one or more distinguishing characteristics of transmitted signals to help the receiving apparatus distinguish between received signals and determine one or more parallel shifts of the antenna 526 relative to the antenna 626. The processor 610, possibly in combination with the memory 630, in combination with the transceiver 620 (e.g., the wireless transmitter 622 and the antenna 626) may comprise means for transmitting the distinction message. In another example implementation, transmitting the one or more first signals and the one or more second signals comprises transmitting the one or more first signals and the one or more second signals concurrently.

Figure 14:
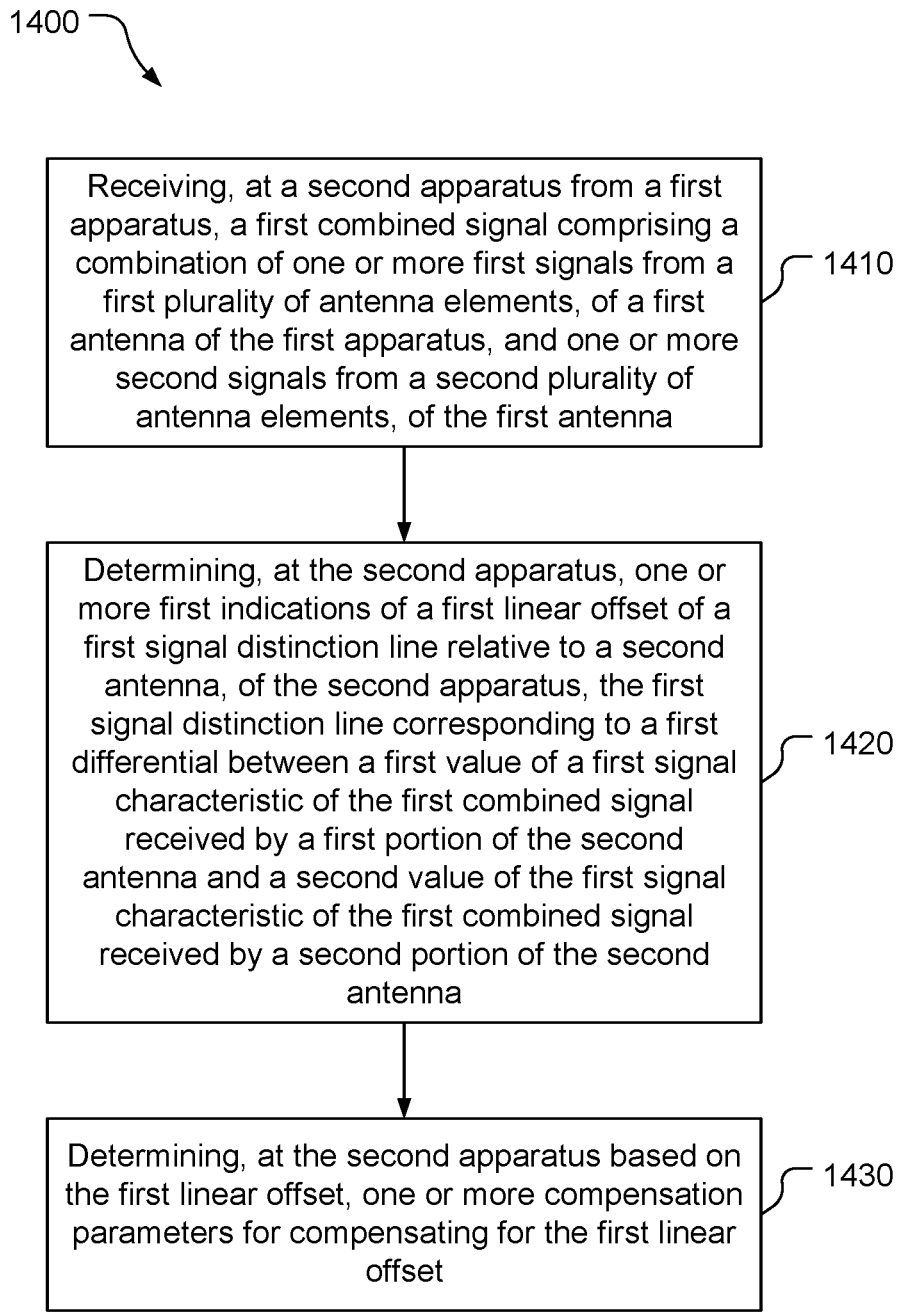
FIG. 14 is a block flow diagram of another antenna offset compensation determination method.

Referring to FIG. 14, with further reference to FIGS. 1-12, an antenna offset compensation determination method 1400 includes the stages shown. The method 1400 is, however, an example and not limiting. The method 1400 may be altered, e.g., by having stages added, removed, rearranged, combined, performed concurrently, and/or having single stages split into multiple stages.

At stage 1410, the method 1400 includes receiving, a first combined signal comprising a combination of at a second apparatus from a first apparatus, one or more first signals from a first plurality of antenna elements, of a first antenna of the first apparatus, and one or more second signals from a second plurality of antenna elements, of the first antenna. For example, at stage 1220, the receiving apparatus 500 receives the pilot signal(s) 1222 from the transmitting apparatus 600. The processor 510, possibly in combination with the memory 530, in combination with the transceiver 520 (e.g., the wireless receiver 524 and the antenna 526) may comprise means for receiving the one or more first signals.

At stage 1420, the method 1400 includes determining, at the second apparatus, one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna. For example, receiving apparatus 500 measures a combined signal (e.g., received by the antenna elements 1010) that is a combination of the signals transmitted by the transmitting apparatus 600 (e.g., S1($t$) transmitted by the antenna elements 910 on the −x side of the y-axis, and S2($t$) transmitted by the antenna elements 910 on the +x side of the y-axis). The receiving apparatus 500 may determine differentials between adjacent ones of the antenna elements 1010 (e.g., adjacent columns of the antenna elements 1010) that receive the combined signal with different signal characteristic values (e.g., phases), and may determine a distinction line, e.g., the offset line 1020, separating antenna elements that correspond to a significant (e.g., above a threshold) differential in signal characteristic values (e.g., a transition in signal characteristic values) of the combined signal corresponding to different signal characteristic values of the transmitted signals, and may determine a distance from a center of the antenna 526 to the distinction line. The processor 510, possibly in combination with the memory 530, may comprise means for determining one or more first indications of a first linear offset of a first signal distinction line relative to the second antenna.

At stage 1430, the method 1400 includes determining, at the second apparatus based on the first linear offset, one or more compensation parameters for compensating for the first linear offset. For example, at stage 1240 the receiving apparatus 500 determines one or more compensation parameters to counteract (e.g., partially or fully correct, or to adjust to) the linear offset. The compensation parameter(s) may include one or more physical antenna movements and/or a post-processing matrix. The processor 610, possibly in combination with the memory 630, may comprise means for determining the one or more compensation parameters.

Implementations of the method 1400 may include one or more of the following features. In an example implementation, determining the one or more compensation parameters comprises determining a post-processing matrix based on a previous post-processing matrix, a first distance separating the first antenna and the second antenna, the first linear offset, and second distances from a reference point of the second antenna to respective antenna elements of the second antenna. For example, at stage 1240 the receiving apparatus 500 determines the post-processing matrix using Equation (10). In another example implementation, determining the one or more first indications of the first linear offset of the first signal distinction line comprises determining a difference between a first phase value of the first combined signal received by the first portion of the second antenna and a second phase value of the first combined signal received by the second portion of the second antenna exceeds a threshold phase difference. For example, the misalignment unit 560 may determine phase differentials per Equations (5)-(8) and determine that a phase jump (e.g., a phase difference above a threshold phase difference) occurs between the column of the antenna elements 1010 as x=$x_2$ and the column of antenna elements 1010 at x=$x_3$. In another example implementation, the method 1400 includes: receiving, at the second apparatus from the first apparatus, a second combined signal comprising a combination of one or more third signals from a third plurality of antenna elements of the first antenna, and one or more fourth signals from a fourth plurality of antenna elements of the first antenna; determining, at the second apparatus, one or more second indications of a second linear offset of a second signal distinction line relative to the second antenna, the second signal distinction line corresponding to a second transition between a third portion of the second antenna that receives the one or more third signals and a fourth portion of the second antenna that receives the one or more fourth signals; and determining, at the second apparatus, the one or more compensation parameters based further on the second linear offset, the one or more compensation parameters being further for compensating for the second linear offset. For example, the receiving apparatus 500 may receive a combined signal (e.g., received by the antenna elements 1010) that is a combination of the signals transmitted by the transmitting apparatus 600 (e.g., S3($t$) transmitted by the antenna elements 910 on the +y side of the x-axis, and S2($t$) transmitted by the antenna elements 910 on the +x side of the y-axis). The misalignment unit 560 may determine differentials between adjacent ones of the antenna elements 1010 (e.g., adjacent rows of the antenna elements 1010) that receive the combined signal with different signal characteristic values (e.g., phases)) and determine a corresponding linear offset, and use the linear offset to determine the post-processing matrix according to Equation (9), and/or one or more antenna movements, to compensate for the second linear offset (e.g., in a direction substantially perpendicular to the first linear offset). The processor 510, possibly in combination with the memory 530, in combination with the transceiver 520 (e.g., the wireless receiver 524 and the antenna 526) may comprise means for receiving one or more third signals and one or more fourth signals. The processor 510, possibly in combination with the memory 530, may comprise means for determining the one or more second indications of the second linear offset. The processor 510, possibly in combination with the memory 530, may comprise means for determining the one or more compensation parameters based further on the second linear offset. In another example implementation, the method 1400 includes transmitting, from the second apparatus to the first apparatus, the one or more first indications of the first linear offset. For example, the receiving apparatus 500 transmits the parallel shift message 1232 with one or more indications of the first linear offset. The processor 510, possibly in combination with the memory 530, in combination with the transceiver 520 (e.g., the wireless transmitter 522 and the antenna 526) may comprise means for transmitting the one or more first indications of the first linear offset. In another example implementation, the method 1400 includes receiving, at the second apparatus from the first apparatus, a distinction message distinguishing between the one or more first signals and the one or more second signals. For example, the receiving apparatus 500 receives the pilot signal type message 1212 providing one or more characteristics to distinguish between received signals to determine the first linear offset. The processor 510, possibly in combination with the memory 530, in combination with the transceiver 520 (e.g., the wireless receiver 524 and the antenna 526) may comprise means for receiving the distinction message.

Simulation

Figure 15:
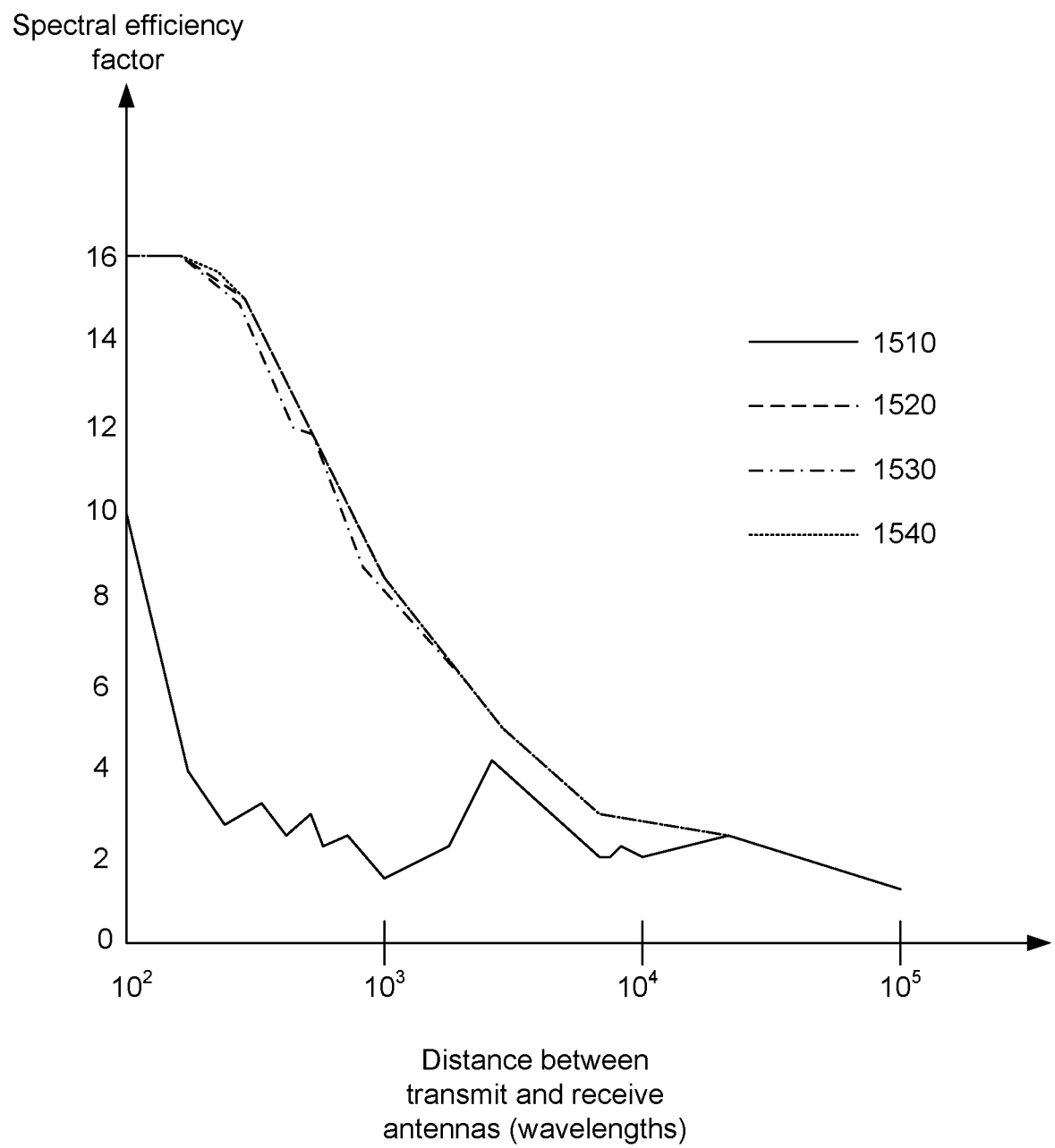
FIG. 15 is a graph of spectral efficiency factor with and without parallel shift compensation.

A signal transfer system with parallel shift determination and compensation was simulated. The simulated system included transmit antenna with a 16×16 array of antenna elements, a receive antenna with a 4×4 array of antenna elements, h=2 (h being the normalized distance between antenna elements in an array, here 2λ), the receive antenna being 100% in the line of sight of the transmit antenna, a signal-to-noise ratio of 130 dB, and wf power allocation. The wf power allocation is the water filling power allocation, which is assumed to be the optimal power allocation for signal transmission of different data streams knowing the channel estimation in this example. The antennas were simulated to have a parallel shift in the positive-x direction (see FIG. 8) within half of a width and/or within half of a height of a receiving antenna array and such parallel shifts were determined accurately (such that the shift(s) could be compensated for to remove error). Referring also to FIG. 15, a spectral efficiency factor, as shown by a plot 1510, as a function of separation of the antennas without parallel shift misalignment compensation was much lower than the spectral efficiency factor, shown by a plot 1520, with parallel shift misalignment compensation, or the spectral efficiency factor, shown by a plot 1530, with parallel shift misalignment compensation with 2 wavelengths of error in parallel shift estimation, or the spectral efficiency factor, shown by a plot 1540, with perfect channel state information characterizing a channel between the antennas.

Implementation Examples

Implementation examples are provided in the following numbered clauses.

Clause 1. A first apparatus comprising:
a transceiver including a first antenna;
a memory; and
a processor, communicatively coupled to the memory and the transceiver, configured to:
transmit, via the transceiver to a second apparatus, one or more first signals from a first plurality of antenna elements, of the first antenna, and one or more second signals from a second plurality of antenna elements, of the first antenna;
receive, via the transceiver, one or more first indications of a first linear offset of a first signal distinction line relative to a second antenna of the second apparatus, the first signal distinction line corresponding to a first transition between the one or more first signals and the one or more second signals as received by the second antenna; and
determine, based on the first linear offset, one or more compensation parameters for compensating for the first linear offset.

Clause 2. The first apparatus of claim 1, wherein to determine the one or more compensation parameters the processor is configured to determine a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements.

Clause 3. The first apparatus of claim 1, wherein the processor is configured to transmit the one or more first signals with a first phase and to transmit the one or more second signals with a second phase that is different from the first phase.

Clause 4. The first apparatus of claim 3, wherein each of the one or more first signals is a first reference signal and each of the one or more second signals is a second reference signal that is substantially equal in magnitude to the first reference signal and between 160° and 200° out of phase with respect to the first reference signal.

Clause 5. The first apparatus of claim 1, wherein the processor is configured to:
transmit, from the transceiver to the second apparatus, one or more third signals from a third plurality of antenna elements, of the first antenna, and one or more fourth signals from a fourth plurality of antenna elements;
receive, via the transceiver, one or more third indications of a second linear offset of a second signal distinction line relative to the second antenna of the second apparatus, the second signal distinction line corresponding to a second transition between the one or more third signals and the one or more fourth signals as received by the second antenna; and
determine the one or more compensation parameters based further on the second linear offset, the one or more compensation parameters being further for compensating for the second linear offset.

Clause 6. The first apparatus of claim 5, wherein the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular, and wherein the first plurality of antenna elements and the second plurality of antenna elements comprise the same antenna elements as the third plurality of antenna elements and the fourth plurality of antenna elements.

Clause 7. The first apparatus of claim 6, wherein the first plurality of antenna elements and the second plurality of antenna elements are disposed symmetrically about the first separator line, and the third plurality of antenna elements and the fourth plurality of antenna elements are disposed symmetrically about the second separator line.

Clause 8. The first apparatus of claim 1, wherein the processor is configured to transmit, via the transceiver to the second apparatus, a distinction message distinguishing between the one or more first signals and the one or more second signals.

Clause 9. The first apparatus of claim 1, wherein the processor is configured to transmit the one or more first signals and the one or more second signals concurrently.

Clause 10. An antenna offset compensation determination method comprising:
- transmitting, from a first apparatus to a second apparatus, one or more first signals from a first plurality of antenna elements, of a first antenna of the first apparatus, and one or more second signals from a second plurality of antenna elements, of the first antenna;
- receiving, at the first apparatus from the second apparatus, one or more first indications of a first linear offset of a first signal distinction line relative to a second antenna of the second apparatus, the first signal distinction line corresponding to a first transition between the one or more first signals and the one or more second signals as received by the second antenna; and
- determining, based on the first linear offset, one or more compensation parameters for compensating for the first linear offset.

Clause 11. The antenna offset compensation determination method of claim 10, wherein determining the one or more compensation parameters comprises determining a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements.

Clause 12. The antenna offset compensation determination method of claim 10, wherein the one or more first signals are transmitted with a first phase and the one or more second signals are transmitted with a second phase that is different from the first phase.

Clause 13. The antenna offset compensation determination method of claim 12, wherein each of the one or more first signals is a first reference signal and each of the one or more second signals is a second reference signal that is substantially equal in magnitude to the first reference signal and between 160° and 200° out of phase with respect to the first reference signal.

Clause 14. The antenna offset compensation determination method of claim 10, further comprising:
- transmitting, from the first apparatus to the second apparatus, one or more third signals from a third plurality of antenna elements, of the first antenna, and one or more fourth signals from a fourth plurality of antenna elements;
- receiving, at the first apparatus from the second apparatus, one or more third indications of a second linear offset of a second signal distinction line relative to the second antenna of the second apparatus, the second signal distinction line corresponding to a second transition between the one or more third signals and the one or more fourth signals as received by the second antenna; and
- determining the one or more compensation parameters based further on the second linear offset, the one or more compensation parameters being further for compensating for the second linear offset.

Clause 15. The antenna offset compensation determination method of claim 14, wherein the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular, and wherein the first plurality of antenna elements and the second plurality of antenna elements comprise the same antenna elements as the third plurality of antenna elements and the fourth plurality of antenna elements.

Clause 16. The antenna offset compensation determination method of claim 15, wherein the first plurality of antenna elements and the second plurality of antenna elements are disposed symmetrically about the first separator line, and the third plurality of antenna elements and the fourth plurality of antenna elements are disposed symmetrically about the second separator line.

Clause 17. The antenna offset compensation determination method of claim 10, further comprising transmitting, from the first apparatus to the second apparatus, a distinction message distinguishing between the one or more first signals and the one or more second signals.

Clause 18. The antenna offset compensation determination method of claim 10, wherein transmitting the one or more first signals and the one or more second signals comprises transmitting the one or more first signals and the one or more second signals concurrently.

Clause 19. A first apparatus comprising:
- means for transmitting, to a second apparatus, one or more first signals from a first plurality of antenna elements, of a first antenna of the first apparatus, and one or more second signals from a second plurality of antenna elements, of the first antenna;
- means for receiving, from the second apparatus, one or more first indications of a first linear offset of a first signal distinction line relative to a second antenna of the second apparatus, the first signal distinction line corresponding to a first transition between the one or more first signals and the one or more second signals as received by the second antenna; and
- means for determining, based on the first linear offset, one or more compensation parameters for compensating for the first linear offset.

Clause 20. The first apparatus of claim 19, wherein the means for determining the one or more compensation parameters comprise means for determining a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements.

Clause 21. The first apparatus of claim 19, wherein the means for transmitting the one or more first signals and the one or more second signals comprise means for transmitting the one or more first signals with a first phase and the one or more second signals with a second phase that is different from the first phase.

Clause 22. The first apparatus of claim 21, wherein each of the one or more first signals is a first reference signal and each of the one or more second signals is a second reference signal that is substantially equal in magnitude to the first reference signal and between 160° and 200° out of phase with respect to the first reference signal.

Clause 23. The first apparatus of claim 19, further comprising:
- means for transmitting, to the second apparatus, one or more third signals from a third plurality of antenna elements, of the first antenna, and one or more fourth signals from a fourth plurality of antenna elements; and
- means for receiving, from the second apparatus, one or more third indications of a second linear offset of a second signal distinction line relative to the second antenna of the second apparatus, the second signal distinction line corresponding to a second transition between the one or more third signals and the one or more fourth signals as received by the second antenna;

wherein the means for determining the one or more compensation parameters comprise means for determining the one or more compensation parameters based further on the second linear offset, the one or more compensation parameters being further for compensating for the second linear offset.

Clause 24. The first apparatus of claim 23, wherein the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular, and wherein the first plurality of antenna elements and the second plurality of antenna elements comprise the same antenna elements as the third plurality of antenna elements and the fourth plurality of antenna elements.

Clause 25. The first apparatus of claim 24, wherein the first plurality of antenna elements and the second plurality of antenna elements are disposed symmetrically about the first separator line, and the third plurality of antenna elements and the fourth plurality of antenna elements are disposed symmetrically about the second separator line.

Clause 26. The first apparatus of claim 19, further comprising means for transmitting, to the second apparatus, a distinction message distinguishing between the one or more first signals and the one or more second signals.

Clause 27. The first apparatus of claim 19, wherein the means for transmitting the one or more first signals and the one or more second signals comprise means for transmitting the one or more first signals and the one or more second signals concurrently.

Clause 28. A non-transitory, processor-readable storage medium comprising processor-readable instructions to cause a processor of a first apparatus to:
transmit, to a second apparatus, one or more first signals from a first plurality of antenna elements, of a first antenna of the first apparatus, and one or more second signals from a second plurality of antenna elements, of the first antenna;
receive, from the second apparatus, one or more first indications of a first linear offset of a first signal distinction line relative to a second antenna of the second apparatus, the first signal distinction line corresponding to a first transition between the one or more first signals and the one or more second signals as received by the second antenna; and
determine, based on the first linear offset, one or more compensation parameters for compensating for the first linear offset.

Clause 29. The non-transitory, processor-readable storage medium of claim 28, wherein the processor-readable instructions to cause the processor to determine the one or more compensation parameters comprise processor-readable instructions to cause the processor to determine a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements.

Clause 30. The non-transitory, processor-readable storage medium of claim 28, wherein the processor-readable instructions to cause the processor to transmit the one or more first signals and the one or more second signals comprise processor-readable instructions to cause the processor to transmit the one or more first signals with a first phase and the one or more second signals with a second phase that is different from the first phase.

Clause 31. The non-transitory, processor-readable storage medium of claim 30, wherein each of the one or more first signals is a first reference signal and each of the one or more second signals is a second reference signal that is substantially equal in magnitude to the first reference signal and between 160° and 200° out of phase with respect to the first reference signal.

Clause 32. The non-transitory, processor-readable storage medium of claim 28, further comprising processor-readable instructions to cause the processor to:
transmit, to the second apparatus, one or more third signals from a third plurality of antenna elements, of the first antenna, and one or more fourth signals from a fourth plurality of antenna elements; and
receive, from the second apparatus, one or more third indications of a second linear offset of a second signal distinction line relative to the second antenna of the second apparatus, the second signal distinction line corresponding to a second transition between the one or more third signals and the one or more fourth signals as received by the second antenna;
wherein the processor-readable instructions to cause the processor to determine the one or more compensation parameters comprise processor-readable instructions to cause the processor to determine the one or more compensation parameters based further on the second linear offset, the one or more compensation parameters being further for compensating for the second linear offset.

Clause 33. The non-transitory, processor-readable storage medium of claim 32, wherein the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular.

Clause 34. The non-transitory, processor-readable storage medium of claim 33, wherein the first plurality of antenna elements and the second plurality of antenna elements are disposed symmetrically about the first separator line, and the third plurality of antenna elements and the fourth plurality of antenna elements are disposed symmetrically about the second separator line.

Clause 35. The non-transitory, processor-readable storage medium of claim 28, further comprising processor-readable instructions to cause the processor to transmit, to the second apparatus, a distinction message distinguishing between the one or more first signals and the one or more second signals.

Clause 36. The non-transitory, processor-readable storage medium of claim 28, wherein the processor-readable instructions to cause the processor to transmit the one or more first signals and the one or more second signals comprise processor-readable instructions to cause the processor to transmit the one or more first signals and the one or more second signals concurrently.

Clause 37. A second apparatus comprising:
a transceiver including a second antenna;
a memory; and a processor, communicatively coupled to the memory and the transceiver, configured to:
  receive, via the transceiver from a first apparatus, a first combined signal comprising a combination of one or more first signals from a first plurality of antenna elements, of a first antenna of the first apparatus, and one or more second signals from a second plurality of antenna elements, of the first antenna;
  determine one or more first indications of a first linear offset of a first signal distinction line relative to the second antenna, the first signal distinction line corresponding to a first differential between a first value of a first signal characteristic of the first combined signal received by a first portion of the second antenna and a second value of the first signal characteristic of the first combined signal received by a second portion of the second antenna; and
  determine, based on the first linear offset, one or more compensation parameters for compensating for the first linear offset.

Clause 38. The second apparatus of claim 37, wherein to determine the one or more compensation parameters the processor is configured to determine a post-processing matrix based on a previous post-processing matrix, a first distance separating the first antenna and the second antenna, the first linear offset, and second distances from a reference point of the second antenna to respective antenna elements of the second antenna.

Clause 39. The second apparatus of claim 37, wherein to determine the one or more first indications of the first linear offset of the first signal distinction line the processor is configured to determine a difference between a first phase value of the first combined signal received by the first portion of the second antenna and a second phase value of the first combined signal received by the second portion of the second antenna exceeds a threshold phase difference.

Clause 40. The second apparatus of claim 37, wherein the processor is configured to:
  receive, via the transceiver from the first apparatus, a second combined signal comprising a combination of one or more third signals from a third plurality of antenna elements of the first antenna, and one or more fourth signals from a fourth plurality of antenna elements of the first antenna;
  determine one or more second indications of a second linear offset of a second signal distinction line relative to the second antenna, the second signal distinction line corresponding to a second differential between a third value of a second signal characteristic of the second combined signal received by a third portion of the second antenna and a fourth value of the second signal characteristic of the second combined signal received by a fourth portion of the second antenna; and
  determine the one or more compensation parameters based further on the second linear offset, the one or more compensation parameters being further for compensating for the second linear offset.

Clause 41. The second apparatus of claim 37, wherein the processor is configured to transmit, via the transceiver to the first apparatus, the one or more first indications of the first linear offset.

Clause 42. The second apparatus of claim 37, wherein the processor is configured to receive, via the transceiver from the first apparatus, a distinction message distinguishing between the one or more first signals and the one or more second signals.

Clause 43. A antenna offset compensation determination method comprising:
  receiving, at a second apparatus from a first apparatus, a first combined signal comprising a combination of one or more first signals from a first plurality of antenna elements, of a first antenna of the first apparatus, and one or more second signals from a second plurality of antenna elements, of the first antenna;
  determining, at the second apparatus, one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and
  determining, at the second apparatus based on the first linear offset, one or more compensation parameters for compensating for the first linear offset.

Clause 44. The antenna offset compensation determination method of claim 43, wherein determining the one or more compensation parameters comprises determining a post-processing matrix based on a previous post-processing matrix, a first distance separating the first antenna and the second antenna, the first linear offset, and second distances from a reference point of the second antenna to respective antenna elements of the second antenna.

Clause 45. The antenna offset compensation determination method of claim 43, wherein determining the one or more first indications of the first linear offset of the first signal distinction line comprises determining a difference between a first phase value of the first combined signal received by the first portion of the second antenna and a second phase value of the first combined signal received by the second portion of the second antenna exceeds a threshold phase difference.

Clause 46. The antenna offset compensation determination method of claim 43, further comprising:
  receiving, at the second apparatus from the first apparatus, a second combined signal comprising a combination of one or more third signals from a third plurality of antenna elements of the first antenna, and one or more fourth signals from a fourth plurality of antenna elements of the first antenna;
  determining, at the second apparatus, one or more second indications of a second linear offset of a second signal distinction line relative to the second antenna, the second signal distinction line corresponding to a second differential between a third value of a second signal characteristic of the second combined signal received by a third portion of the second antenna and a fourth value of the second signal characteristic of the second combined signal received by a fourth portion of the second antenna; and
  determining, at the second apparatus, the one or more compensation parameters based further on the second linear offset, the one or more compensation parameters being further for compensating for the second linear offset.

Clause 47. The antenna offset compensation determination method of claim 43, further comprising transmitting, from the second apparatus to the first apparatus, the one or more first indications of the first linear offset.

Clause 48. The antenna offset compensation determination method of claim 43, further comprising receiving, at the second apparatus from the first apparatus, a distinction message distinguishing between the one or more first signals and the one or more second signals.

Clause 49. A second apparatus comprising:
- means for receiving, from a first apparatus, a first combined signal comprising a combination of one or more first signals from a first plurality of antenna elements, of a first antenna of the first apparatus, and one or more second signals from a second plurality of antenna elements, of the first antenna;
- means for determining one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and
- means for determining, based on the first linear offset, one or more compensation parameters for compensating for the first linear offset.

Clause 50. The second apparatus of claim 49, wherein the means for determining the one or more compensation parameters comprise means for determining a post-processing matrix based on a previous post-processing matrix, a first distance separating the first antenna and the second antenna, the first linear offset, and second distances from a reference point of the second antenna to respective antenna elements of the second antenna.

Clause 51. The second apparatus of claim 49, wherein the means for determining the one or more first indications of the first linear offset of the first signal distinction line comprise means for determining a difference between a first phase value of the first combined signal received by the first portion of the second antenna and a second phase value of the first combined signal received by the second portion of the second antenna exceeds a threshold phase difference.

Clause 52. The second apparatus of claim 49, further comprising:
- means for receiving, from the first apparatus, a second combined signal comprising a combination of one or more third signals from a third plurality of antenna elements of the first antenna, and one or more fourth signals from a fourth plurality of antenna elements of the first antenna; and
- means for determining one or more second indications of a second linear offset of a second signal distinction line relative to the second antenna, the second signal distinction line corresponding to a second differential between a third value of a second signal characteristic of the second combined signal received by a third portion of the second antenna and a fourth value of the second signal characteristic of the second combined signal received by a fourth portion of the second antenna; and
- wherein the means for determining the one or more compensation parameters comprise means for determining the one or more compensation parameters based further on the second linear offset, the one or more compensation parameters being further for compensating for the second linear offset.

Clause 53. The second apparatus of claim 49, further comprising means for transmitting, to the first apparatus, the one or more first indications of the first linear offset.

Clause 54. The second apparatus of claim 49, further comprising means for receiving, from the first apparatus, a distinction message distinguishing between the one or more first signals and the one or more second signals.

Clause 55. A non-transitory, processor-readable storage medium comprising processor-readable instructions to cause a processor of a second apparatus to:
- receive, from a first apparatus, a first combined signal comprising a combination of one or more first signals from a first plurality of antenna elements, of a first antenna of the first apparatus, and one or more second signals from a second plurality of antenna elements, of the first antenna;
- determine one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and
- determine, based on the first linear offset, one or more compensation parameters for compensating for the first linear offset.

Clause 56. The non-transitory, processor-readable storage medium of claim 55, wherein the processor-readable instructions to cause the processor to determine the one or more compensation parameters comprise processor-readable instructions to cause the processor to determine a post-processing matrix based on a previous post-processing matrix, a first distance separating the first antenna and the second antenna, the first linear offset, and second distances from a reference point of the second antenna to respective antenna elements of the second antenna.

Clause 57. The non-transitory, processor-readable storage medium of claim 55, wherein the processor-readable instructions to cause the processor to determine the one or more first indications of the first linear offset of the first signal distinction line comprise processor-readable instructions to cause the processor to determine a difference between a first phase value of the first combined signal received by the first portion of the second antenna and a second phase value of the first combined signal received by the second portion of the second antenna exceeds a threshold phase difference.

Clause 58. The non-transitory, processor-readable storage medium of claim 55, further comprising processor-readable instructions to cause the processor to:
- receive, from the first apparatus, a second combined signal comprising a combination of one or more third signals from a third plurality of antenna elements of the first antenna, and one or more fourth signals from a fourth plurality of antenna elements of the first antenna;
- determine one or more second indications of a second linear offset of a second signal distinction line relative to the second antenna, the second signal distinction line corresponding to a second differential between a third value of a second signal characteristic of the second combined signal received by a third portion of the second antenna and a fourth value of the second signal characteristic of the second combined signal received by a fourth portion of the second antenna; and
- determine the one or more compensation parameters based further on the second linear offset, the one or more compensation parameters being further for compensating for the second linear offset.

Clause 59. The non-transitory, processor-readable storage medium of claim 55, further comprising processor-readable instructions to cause the processor to transmit, to the first apparatus, the one or more first indications of the first linear offset.

Clause 60. The non-transitory, processor-readable storage medium of claim 55, further comprising processor-readable instructions to cause the processor to receive, from the first apparatus, a distinction message distinguishing between the one or more first signals and the one or more second signals.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A first apparatus comprising:
a transceiver including a first antenna;
a memory; and
a processor, communicatively coupled to the memory and the transceiver, configured to:
transmit, via the transceiver to a second apparatus, one or more first signals from a first plurality of antenna elements, of the first antenna, and one or more second signals from a second plurality of antenna elements, of the first antenna;
receive, via the transceiver, one or more first indications of a first linear offset of a first signal distinction line relative to a second antenna of the second apparatus, the first signal distinction line corresponding to a first transition between the one or more first signals and the one or more second signals as received by the second antenna; and
determine, based on the first linear offset, one or more compensation parameters for compensating for the first linear offset.

2. The first apparatus of claim 1, wherein to determine the one or more compensation parameters the processor is configured to determine a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements.

3. The first apparatus of claim 1, wherein the processor is configured to transmit the one or more first signals with a first phase and to transmit the one or more second signals with a second phase that is different from the first phase.

4. The first apparatus of claim 3, wherein each of the one or more first signals is a first reference signal and each of the one or more second signals is a second reference signal that is substantially equal in magnitude to the first reference signal and between 160° and 200° out of phase with respect to the first reference signal.

5. The first apparatus of claim 1, wherein the processor is configured to:
transmit, from the transceiver to the second apparatus, one or more third signals from a third plurality of antenna elements, of the first antenna, and one or more fourth signals from a fourth plurality of antenna elements;
receive, via the transceiver, one or more third indications of a second linear offset of a second signal distinction line relative to the second antenna of the second apparatus, the second signal distinction line corresponding to a second transition between the one or more third signals and the one or more fourth signals as received by the second antenna; and
determine the one or more compensation parameters based further on the second linear offset, the one or more compensation parameters being further for compensating for the second linear offset.

6. The first apparatus of claim 5, wherein the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular, and wherein the first plurality of antenna elements and the second plurality of antenna elements comprise the same antenna elements as the third plurality of antenna elements and the fourth plurality of antenna elements.

7. The first apparatus of claim 6, wherein the first plurality of antenna elements and the second plurality of antenna elements are disposed symmetrically about the first separator line, and the third plurality of antenna elements and the fourth plurality of antenna elements are disposed symmetrically about the second separator line.

8. The first apparatus of claim 1, wherein the processor is configured to transmit, via the transceiver to the second apparatus, a distinction message distinguishing between the one or more first signals and the one or more second signals.

9. The first apparatus of claim 1, wherein the processor is configured to transmit the one or more first signals and the one or more second signals concurrently.

10. An antenna offset compensation determination method comprising:
transmitting, from a first apparatus to a second apparatus, one or more first signals from a first plurality of antenna elements, of a first antenna of the first apparatus, and one or more second signals from a second plurality of antenna elements, of the first antenna;
receiving, at the first apparatus from the second apparatus, one or more first indications of a first linear offset of a first signal distinction line relative to a second antenna of the second apparatus, the first signal distinction line corresponding to a first transition between the one or more first signals and the one or more second signals as received by the second antenna; and determining, based on the first linear offset, one or more compensation parameters for compensating for the first linear offset.

11. The antenna offset compensation determination method of claim 10, wherein determining the one or more compensation parameters comprises determining a precoder matrix based on a previous precoder matrix, a first distance separating the first antenna and the second antenna, the first linear offset, and second distances from a reference point of the first antenna to respective antenna elements of the first plurality of antenna elements and the second plurality of antenna elements.

12. The antenna offset compensation determination method of claim 10, wherein the one or more first signals are transmitted with a first phase and the one or more second signals are transmitted with a second phase that is different from the first phase.

13. The antenna offset compensation determination method of claim 12, wherein each of the one or more first signals is a first reference signal and each of the one or more second signals is a second reference signal that is substantially equal in magnitude to the first reference signal and between 160° and 200° out of phase with respect to the first reference signal.

14. The antenna offset compensation determination method of claim 10, further comprising:

transmitting, from the first apparatus to the second apparatus, one or more third signals from a third plurality of antenna elements, of the first antenna, and one or more fourth signals from a fourth plurality of antenna elements;

receiving, at the first apparatus from the second apparatus, one or more third indications of a second linear offset of a second signal distinction line relative to the second antenna of the second apparatus, the second signal distinction line corresponding to a second transition between the one or more third signals and the one or more fourth signals as received by the second antenna; and determining the one or more compensation parameters based further on the second linear offset, the one or more compensation parameters being further for compensating for the second linear offset.

15. The antenna offset compensation determination method of claim 14, wherein the first plurality of antenna elements and the second plurality of antenna elements are disposed on opposite sides of a first separator line, the third plurality of antenna elements and the fourth plurality of antenna elements are disposed on opposite sides of a second separator line, and the first separator line and the second separator line are substantially perpendicular, and wherein the first plurality of antenna elements and the second plurality of antenna elements comprise the same antenna elements as the third plurality of antenna elements and the fourth plurality of antenna elements.

16. The antenna offset compensation determination method of claim 15, wherein the first plurality of antenna elements and the second plurality of antenna elements are disposed symmetrically about the first separator line, and the third plurality of antenna elements and the fourth plurality of antenna elements are disposed symmetrically about the second separator line.

17. The antenna offset compensation determination method of claim 10, further comprising transmitting, from the first apparatus to the second apparatus, a distinction message distinguishing between the one or more first signals and the one or more second signals.

18. The antenna offset compensation determination method of claim 10, wherein transmitting the one or more first signals and the one or more second signals comprises transmitting the one or more first signals and the one or more second signals concurrently.

19. A second apparatus comprising:

a transceiver including a second antenna;

a memory; and a processor, communicatively coupled to the memory and the transceiver, configured to:

receive, via the transceiver from a first apparatus, a first combined signal comprising a combination of one or more first signals from a first plurality of antenna elements, of a first antenna of the first apparatus, and one or more second signals from a second plurality of antenna elements, of the first antenna;

determine one or more first indications of a first linear offset of a first signal distinction line relative to the second antenna, the first signal distinction line corresponding to a first differential between a first value of a first signal characteristic of the first combined signal received by a first portion of the second antenna and a second value of the first signal characteristic of the first combined signal received by a second portion of the second antenna; and determine, based on the first linear offset, one or more compensation parameters for compensating for the first linear offset.

20. The second apparatus of claim 19, wherein to determine the one or more compensation parameters the processor is configured to determine a post-processing matrix based on a previous post-processing matrix, a first distance separating the first antenna and the second antenna, the first linear offset, and second distances from a reference point of the second antenna to respective antenna elements of the second antenna.

21. The second apparatus of claim 19, wherein to determine the one or more first indications of the first linear offset of the first signal distinction line the processor is configured to determine a difference between a first phase value of the first combined signal received by the first portion of the second antenna and a second phase value of the first combined signal received by the second portion of the second antenna exceeds a threshold phase difference.

22. The second apparatus of claim 19, wherein the processor is configured to:

receive, via the transceiver from the first apparatus, a second combined signal comprising a combination of one or more third signals from a third plurality of antenna elements of the first antenna, and one or more fourth signals from a fourth plurality of antenna elements of the first antenna;

determine one or more second indications of a second linear offset of a second signal distinction line relative to the second antenna, the second signal distinction line corresponding to a second differential between a third value of a second signal characteristic of the second combined signal received by a third portion of the second antenna and a fourth value of the second signal characteristic of the second combined signal received by a fourth portion of the second antenna; and determine the one or more compensation parameters based further on the second linear offset, the one or more compensation parameters being further for compensating for the second linear offset.

23. The second apparatus of claim 19, wherein the processor is configured to transmit, via the transceiver to the first apparatus, the one or more first indications of the first linear offset.

24. The second apparatus of claim 19, wherein the processor is configured to receive, via the transceiver from the first apparatus, a distinction message distinguishing between the one or more first signals and the one or more second signals.

25. A antenna offset compensation determination method comprising:
  receiving, at a second apparatus from a first apparatus, a first combined signal comprising a combination of one or more first signals from a first plurality of antenna elements, of a first antenna of the first apparatus, and one or more second signals from a second plurality of antenna elements, of the first antenna;
  determining, at the second apparatus, one or more first indications of a first linear offset of a first signal distinction line relative to a second antenna, of the second apparatus, the first signal distinction line corresponding to a first differential between a first value of a first signal characteristic of the first combined signal received by a first portion of the second antenna and a second value of the first signal characteristic of the first combined signal received by a second portion of the second antenna; and
  determining, at the second apparatus based on the first linear offset, one or more compensation parameters for compensating for the first linear offset.

26. The antenna offset compensation determination method of claim 25, wherein determining the one or more compensation parameters comprises determining a post-processing matrix based on a previous post-processing matrix, a first distance separating the first antenna and the second antenna, the first linear offset, and second distances from a reference point of the second antenna to respective antenna elements of the second antenna.

27. The antenna offset compensation determination method of claim 25, wherein determining the one or more first indications of the first linear offset of the first signal distinction line comprises determining a difference between a first phase value of the first combined signal received by the first portion of the second antenna and a second phase value of the first combined signal received by the second portion of the second antenna exceeds a threshold phase difference.

28. The antenna offset compensation determination method of claim 25, further comprising:
  receiving, at the second apparatus from the first apparatus, a second combined signal comprising a combination of one or more third signals from a third plurality of antenna elements of the first antenna, and one or more fourth signals from a fourth plurality of antenna elements of the first antenna;
  determining, at the second apparatus, one or more second indications of a second linear offset of a second signal distinction line relative to the second antenna, the second signal distinction line corresponding to a second differential between a third value of a second signal characteristic of the second combined signal received by a third portion of the second antenna and a fourth value of the second signal characteristic of the second combined signal received by a fourth portion of the second antenna; and
  determining, at the second apparatus, the one or more compensation parameters based further on the second linear offset, the one or more compensation parameters being further for compensating for the second linear offset.

29. The antenna offset compensation determination method of claim 25, further comprising transmitting, from the second apparatus to the first apparatus, the one or more first indications of the first linear offset.

30. The antenna offset compensation determination method of claim 25, further comprising receiving, at the second apparatus from the first apparatus, a distinction message distinguishing between the one or more first signals and the one or more second signals.

* * * * *